United States Patent
Ross et al.

(10) Patent No.: US 10,074,394 B2
(45) Date of Patent: Sep. 11, 2018

(54) COMPUTER PROGRAM, METHOD, AND SYSTEM FOR MANAGING MULTIPLE DATA RECORDING DEVICES

(71) Applicant: Digital Ally, Inc., Lenexa, KS (US)

(72) Inventors: Stanton E. Ross, Overland Park, KS (US); Troy D. Bowlin, Odessa, MO (US); Matthew R. Andrews, Lenexa, KS (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

(21) Appl. No.: 15/446,226

(22) Filed: Mar. 1, 2017

(65) Prior Publication Data

US 2017/0178678 A1 Jun. 22, 2017

Related U.S. Application Data

(63) Continuation of application No. 15/011,132, filed on Jan. 29, 2016, which is a continuation of application
(Continued)

(51) Int. Cl.
*H04N 5/77* (2006.01)
*H04N 9/80* (2006.01)
(Continued)

(52) U.S. Cl.
CPC .......... *G11B 15/023* (2013.01); *G11B 15/026* (2013.01); *G11B 19/025* (2013.01);
(Continued)

(58) Field of Classification Search
None
See application file for complete search history.

(56) References Cited

U.S. PATENT DOCUMENTS 4,409,670 A 10/1983 Herndon et al.
4,789,904 A 12/1988 Peterson
(Continued)

FOREIGN PATENT DOCUMENTS

DE 102010019451 A1 11/2011
EP 247993 A2 7/2012
(Continued)

OTHER PUBLICATIONS

Ecplaza HY-001HD law enforcement DVR, http://fireeye.en.ecplaza.net/law-enforcement-dvr--238185-1619696.html, Sep. 26, 2013, Date Posted: Unknown, pp. 1-3.
(Continued)

*Primary Examiner* — Hung Q Dang
(74) *Attorney, Agent, or Firm* — Erise IP, P.A.

(57) ABSTRACT

A multiple recording device management system including an intermediate multiple recording device managing apparatus, a vehicle recording device mounted in a police vehicle and synced to the managing apparatus, and a personal recording device carried by a police officer and wirelessly synced to the managing apparatus. The managing apparatus is operable to detect when the vehicle recording device, personal recording device, or any other synced device in range has begun recording and to transmit a communication signal to any synced recording device in range indicating that the recording device should begin recording and to further transmit a time stamp to synced recording devices for corroborating recorded data.

20 Claims, 6 Drawing Sheets

Related U.S. Application Data

No. 13/967,151, filed on Aug. 14, 2013, now Pat. No. 9,253,452.

(51) Int. Cl.

| | | |
|---|---|---|
| *G11B 15/02* | (2006.01) | |
| *G11B 27/10* | (2006.01) | |
| *H04N 5/76* | (2006.01) | |
| *H04N 5/765* | (2006.01) | |
| *H04H 20/00* | (2009.01) | |
| *G11B 27/11* | (2006.01) | |
| *G11B 27/34* | (2006.01) | |
| *G11B 31/00* | (2006.01) | |
| *H04N 7/18* | (2006.01) | |
| *G11B 19/02* | (2006.01) | |
| *H04N 5/91* | (2006.01) | |

(52) U.S. Cl.
CPC ............ *G11B 19/027* (2013.01); *G11B 27/10* (2013.01); *G11B 27/11* (2013.01); *G11B 27/34* (2013.01); *G11B 31/006* (2013.01); *H04H 20/00* (2013.01); *H04N 5/76* (2013.01); *H04N 5/765* (2013.01); *H04N 5/77* (2013.01); *H04N 5/91* (2013.01); *H04N 7/181* (2013.01); *H04N 7/183* (2013.01); *H04N 7/188* (2013.01)

(56) References Cited

U.S. PATENT DOCUMENTS

| | | |
|---|---|---|
| 4,863,130 A | 9/1989 | Marks, Jr. |
| 4,918,473 A | 4/1990 | Blackshear |
| 5,027,104 A | 6/1991 | Reid |
| 5,096,287 A | 3/1992 | Kaikinami et al. |
| 5,111,289 A | 5/1992 | Lucas et al. |
| 5,289,321 A | 2/1994 | Secor |
| 5,381,155 A | 1/1995 | Gerber |
| 5,408,330 A | 4/1995 | Squicciarii et al. |
| 5,446,659 A | 8/1995 | Yamawaki |
| 5,453,939 A | 9/1995 | Hoffman et al. |
| 5,473,729 A | 12/1995 | Bryant et al. |
| 5,479,149 A | 12/1995 | Pike |
| 5,497,419 A | 3/1996 | Hill |
| 5,526,133 A | 6/1996 | Paff |
| 5,585,798 A | 12/1996 | Yoshioka et al. |
| 5,642,285 A | 6/1997 | Woo et al. |
| 5,668,675 A | 9/1997 | Fredricks |
| 5,689,442 A | 11/1997 | Swanson et al. |
| 5,742,336 A | 4/1998 | Lee |
| 5,752,632 A | 5/1998 | Sanderson et al. |
| 5,798,458 A | 8/1998 | Monroe |
| 5,815,093 A | 9/1998 | Kikinis |
| 5,850,613 A | 12/1998 | Bullecks |
| 5,878,283 A | 3/1999 | House et al. |
| 5,886,739 A | 3/1999 | Winningstad |
| 5,890,079 A | 3/1999 | Levine |
| 5,926,210 A | 7/1999 | Hackett et al. |
| 5,962,806 A | 10/1999 | Coakley et al. |
| 5,978,017 A | 11/1999 | Tino |
| 5,983,161 A | 11/1999 | Lemelson et al. |
| 5,996,023 A | 11/1999 | Winter et al. |
| 6,008,841 A | 12/1999 | Charlson |
| 6,028,528 A | 2/2000 | Lorenzetti et al. |
| 6,052,068 A | 4/2000 | Price R-W et al. |
| 6,097,429 A | 8/2000 | Seeley et al. |
| 6,100,806 A | 8/2000 | Gaukel |
| 6,121,881 A | 9/2000 | Bieback et al. |
| 6,141,609 A | 10/2000 | Herdeg et al. |
| 6,141,611 A | 10/2000 | Mackey et al. |
| 6,163,338 A | 12/2000 | Johnson et al. |
| 6,175,300 B1 | 1/2001 | Kendrick |
| 6,298,290 B1 | 10/2001 | Abe et al. |
| 6,310,541 B1 | 10/2001 | Atkins |
| 6,314,364 B1 | 11/2001 | Nakamura |
| 6,324,053 B1 | 11/2001 | Kamijo |
| 6,326,900 B2 | 12/2001 | Deline et al. |
| 6,333,694 B2 | 12/2001 | Pierce et al. |
| 6,333,759 B1 | 12/2001 | Mazzilli |
| 6,370,475 B1 | 4/2002 | Breed et al. |
| RE37,709 E | 5/2002 | Dukek |
| 6,389,340 B1 | 5/2002 | Rayner |
| 6,396,403 B1 | 5/2002 | Haner |
| 6,405,112 B1 | 6/2002 | Rayner |
| 6,449,540 B1 | 9/2002 | Rayner |
| 6,452,572 B1 | 9/2002 | Fan et al. |
| 6,490,409 B1 | 12/2002 | Walker |
| 6,518,881 B2 | 2/2003 | Monroe |
| 6,525,672 B2 | 2/2003 | Chainer et al. |
| 6,546,119 B2 | 4/2003 | Ciolli et al. |
| 6,560,463 B1 | 5/2003 | Santhoff |
| 6,563,532 B1 | 5/2003 | Strub et al. |
| 6,591,242 B1 | 7/2003 | Karp et al. |
| 6,681,195 B1 | 1/2004 | Poland et al. |
| 6,690,268 B2 | 2/2004 | Schofield et al. |
| 6,697,103 B1 | 2/2004 | Fernandez et al. |
| 6,718,239 B2 | 4/2004 | Rayer |
| 6,727,816 B1 | 4/2004 | Helgeson |
| 6,748,792 B1 | 6/2004 | Freund et al. |
| 6,823,621 B2 | 11/2004 | Gotfried |
| 6,831,556 B1 | 12/2004 | Boykin |
| 6,856,873 B2 | 2/2005 | Breed et al. |
| 6,883,694 B2 | 4/2005 | Abelow |
| 6,970,183 B1 | 11/2005 | Monroe |
| 7,012,632 B2 | 3/2006 | Freeman et al. |
| 7,034,683 B2 | 4/2006 | Ghazarian |
| D520,738 S | 5/2006 | Tarantino |
| 7,038,590 B2 | 5/2006 | Hoffman et al. |
| 7,088,387 B1 | 8/2006 | Freeman et al. |
| 7,119,832 B2 | 10/2006 | Blanco et al. |
| 7,126,472 B2 | 10/2006 | Kraus et al. |
| 7,147,155 B2 | 12/2006 | Weekes |
| 7,180,407 B1 | 2/2007 | Guo et al. |
| 7,190,822 B2 | 3/2007 | Gammenthaler |
| 7,363,742 B2 | 4/2008 | Nerheim |
| 7,371,021 B2 | 5/2008 | Ross et al. |
| 7,421,024 B2 | 9/2008 | Castillo |
| 7,436,143 B2 | 10/2008 | Lakshmanan et al. |
| 7,436,955 B2 | 10/2008 | Yan et al. |
| 7,448,996 B2 | 11/2008 | Khanuja et al. |
| 7,456,875 B2 | 11/2008 | Kashiwa |
| 7,496,140 B2 | 2/2009 | Winningstad et al. |
| 7,500,794 B1 | 3/2009 | Clark |
| 7,508,941 B1 | 3/2009 | O'Toole, Jr. et al. |
| 7,536,457 B2 | 5/2009 | Miller |
| 7,539,533 B2 | 5/2009 | Tran |
| 7,561,037 B1 | 7/2009 | Monroe |
| 7,594,305 B2 | 9/2009 | Moore |
| 7,602,301 B1 | 10/2009 | Stirling et al. |
| 7,656,439 B1 | 2/2010 | Manico et al. |
| 7,659,827 B2 | 2/2010 | Gunderson et al. |
| 7,680,947 B2 | 3/2010 | Nicholl et al. |
| 7,697,035 B1 | 4/2010 | Suber, III et al. |
| 7,804,426 B2 | 9/2010 | Etcheson |
| 7,806,525 B2 | 10/2010 | Howell et al. |
| 7,853,944 B2 | 12/2010 | Choe |
| 7,944,676 B2 | 5/2011 | Smith et al. |
| 8,077,029 B1 | 12/2011 | Daniel et al. |
| 8,121,306 B2 | 2/2012 | Cilia et al. |
| 8,175,314 B1 | 5/2012 | Webster |
| 8,269,617 B2 | 9/2012 | Cook et al. |
| 8,314,708 B2 | 11/2012 | Gunderson et al. |
| 8,350,907 B1 * | 1/2013 | Blanco ............... H04N 21/4335 348/143 |
| 8,356,438 B2 | 1/2013 | Brundula et al. |
| 8,373,567 B2 | 2/2013 | Denson |
| 8,373,797 B2 | 2/2013 | Ishii et al. |
| 8,384,539 B2 | 2/2013 | Denny et al. |
| 8,446,469 B2 | 5/2013 | Blanco et al. |
| 8,456,293 B1 | 6/2013 | Trundle et al. |
| 8,508,353 B2 | 8/2013 | Cook et al. |
| 8,594,485 B2 | 11/2013 | Brundula |
| 8,606,492 B1 | 12/2013 | Botnen |
| 8,676,428 B2 | 3/2014 | Richardson et al. |

(56) References Cited

U.S. PATENT DOCUMENTS

| | | | |
|---|---|---|---|
| 8,690,365 B1* | 4/2014 | Williams | B60R 1/06 359/850 |
| 8,707,758 B2 | 4/2014 | Keays | |
| 8,725,462 B2 | 5/2014 | Jain et al. | |
| 8,744,642 B2 | 6/2014 | Nemat-Nasser et al. | |
| 8,780,205 B2 | 7/2014 | Boutell et al. | |
| 8,781,292 B1 | 7/2014 | Ross et al. | |
| 8,805,431 B2 | 8/2014 | Vasavada et al. | |
| 8,849,501 B2 | 9/2014 | Cook et al. | |
| 8,854,199 B2 | 10/2014 | Cook et al. | |
| 8,887,208 B1* | 11/2014 | Merrit | H04N 21/41407 370/316 |
| 8,930,072 B1 | 1/2015 | Lambert et al. | |
| 8,989,914 B1 | 3/2015 | Nemat-Nasser et al. | |
| 8,996,234 B1 | 3/2015 | Tamari et al. | |
| 9,003,474 B1 | 4/2015 | Smith | |
| 9,058,499 B1 | 6/2015 | Smith | |
| 9,122,082 B2 | 9/2015 | Abreau | |
| 9,164,543 B2 | 10/2015 | Minn et al. | |
| 9,253,452 B2 | 2/2016 | Ross et al. | |
| 9,591,255 B2* | 3/2017 | Sakiewicz | H04N 5/772 |
| 9,841,259 B2 | 12/2017 | Phillips et al. | |
| 2002/0013517 A1 | 1/2002 | West et al. | |
| 2002/0019696 A1 | 2/2002 | Kruse | |
| 2002/0032510 A1 | 3/2002 | Tumball et al. | |
| 2002/0044065 A1 | 4/2002 | Quist et al. | |
| 2002/0049881 A1 | 4/2002 | Sugimura | |
| 2002/0084130 A1 | 7/2002 | Der Gazarian et al. | |
| 2002/0131768 A1 | 9/2002 | Gammenthaler | |
| 2002/0135336 A1 | 9/2002 | Zhou et al. | |
| 2002/0159434 A1 | 10/2002 | Gosior et al. | |
| 2002/0191952 A1 | 12/2002 | Fiore et al. | |
| 2003/0040917 A1 | 2/2003 | Fiedler | |
| 2003/0080713 A1 | 5/2003 | Kirmuss | |
| 2003/0080878 A1 | 5/2003 | Kirmuss | |
| 2003/0081121 A1 | 5/2003 | Kirmuss | |
| 2003/0081934 A1 | 5/2003 | Kirmuss | |
| 2003/0081935 A1 | 5/2003 | Kirmuss | |
| 2003/0081942 A1 | 5/2003 | Melnyk et al. | |
| 2003/0095688 A1 | 5/2003 | Kirmuss | |
| 2003/0106917 A1 | 6/2003 | Shelter et al. | |
| 2003/0133018 A1 | 7/2003 | Ziemkowski | |
| 2003/0151510 A1 | 8/2003 | Quintana et al. | |
| 2003/0184674 A1 | 10/2003 | Manico et al. | |
| 2003/0185417 A1 | 10/2003 | Alattar et al. | |
| 2003/0215010 A1 | 11/2003 | Kashiwa | |
| 2003/0215114 A1 | 11/2003 | Kyle | |
| 2003/0222982 A1 | 12/2003 | Hamdan et al. | |
| 2004/0008255 A1 | 1/2004 | Lewellen | |
| 2004/0043765 A1 | 3/2004 | Tolhurst | |
| 2004/0143373 A1 | 6/2004 | Ennis | |
| 2004/0145457 A1 | 7/2004 | Schofield et al. | |
| 2004/0150717 A1 | 8/2004 | Page et al. | |
| 2004/0168002 A1 | 8/2004 | Accarie et al. | |
| 2004/0199785 A1 | 10/2004 | Pederson | |
| 2004/0223054 A1 | 11/2004 | Rotholtz | |
| 2004/0243734 A1 | 12/2004 | Kitagawa et al. | |
| 2004/0267419 A1 | 12/2004 | Jing | |
| 2005/0030151 A1 | 2/2005 | Singh | |
| 2005/0046583 A1 | 3/2005 | Richards | |
| 2005/0050266 A1 | 3/2005 | Haas et al. | |
| 2005/0068169 A1 | 3/2005 | Copley et al. | |
| 2005/0083404 A1 | 4/2005 | Pierce et al. | |
| 2005/0094966 A1 | 5/2005 | Elberbaum | |
| 2005/0100329 A1 | 5/2005 | Lao et al. | |
| 2005/0101334 A1 | 5/2005 | Brown et al. | |
| 2005/0134966 A1 | 5/2005 | Burgner | |
| 2005/0132200 A1 | 6/2005 | Jaffe et al. | |
| 2005/0151852 A1 | 7/2005 | Jomppanen | |
| 2005/0035161 A1 | 8/2005 | Shioda | |
| 2005/0185438 A1 | 8/2005 | Ching | |
| 2005/0206532 A1 | 9/2005 | Lock | |
| 2005/0206741 A1 | 9/2005 | Raber | |
| 2005/0228234 A1 | 10/2005 | Yang | |
| 2005/0232469 A1 | 10/2005 | Schofield et al. | |
| 2005/0243171 A1 | 11/2005 | Ross, Sr. et al. | |
| 2005/0258942 A1 | 11/2005 | Manasseh et al. | |
| 2006/0009238 A1 | 1/2006 | Stanco et al. | |
| 2006/0028811 A1 | 2/2006 | Ross, Jr. et al. | |
| 2006/0055786 A1 | 3/2006 | Ollila | |
| 2006/0158968 A1 | 7/2006 | Vanman et al. | |
| 2006/0164220 A1 | 7/2006 | Harter, Jr. et al. | |
| 2006/0164534 A1 | 7/2006 | Robinson et al. | |
| 2006/0170770 A1 | 8/2006 | MacCarthy | |
| 2006/0176149 A1 | 8/2006 | Douglas | |
| 2006/0183505 A1 | 8/2006 | Willrich | |
| 2006/0193749 A1 | 8/2006 | Ghazarian et al. | |
| 2006/0203090 A1 | 9/2006 | Wang et al. | |
| 2006/0220826 A1 | 10/2006 | Rast | |
| 2006/0225253 A1 | 10/2006 | Bates | |
| 2006/0244601 A1 | 11/2006 | Nishimura | |
| 2006/0256822 A1 | 11/2006 | Kwong et al. | |
| 2006/0270465 A1 | 11/2006 | Lee et al. | |
| 2006/0271287 A1 | 11/2006 | Gold et al. | |
| 2006/0274166 A1 | 12/2006 | Lee et al. | |
| 2006/0274828 A1 | 12/2006 | Siemens et al. | |
| 2006/0276200 A1 | 12/2006 | Radhakrishnan et al. | |
| 2006/0282021 A1 | 12/2006 | DeVaul et al. | |
| 2006/0287821 A1 | 12/2006 | Lin | |
| 2006/0293571 A1 | 12/2006 | Bao et al. | |
| 2007/0021134 A1 | 1/2007 | Liou | |
| 2007/0064108 A1 | 3/2007 | Haler | |
| 2007/0067079 A1 | 3/2007 | Kosugi | |
| 2007/0091557 A1 | 4/2007 | Kim et al. | |
| 2007/0102508 A1 | 5/2007 | Mcintosh | |
| 2007/0117083 A1 | 5/2007 | Winneg et al. | |
| 2007/0132567 A1 | 6/2007 | Schofield et al. | |
| 2007/0152811 A1 | 7/2007 | Anderson | |
| 2007/0172053 A1 | 7/2007 | Poirier | |
| 2007/0177023 A1 | 8/2007 | Beuhler et al. | |
| 2007/0199076 A1 | 8/2007 | Rensin et al. | |
| 2007/0229350 A1 | 10/2007 | Scalisi et al. | |
| 2007/0257781 A1 | 11/2007 | Denson | |
| 2007/0257782 A1 | 11/2007 | Etcheson | |
| 2007/0257804 A1 | 11/2007 | Gunderson et al. | |
| 2007/0257815 A1 | 11/2007 | Gunderson et al. | |
| 2007/0260361 A1 | 11/2007 | Etcheson | |
| 2007/0268158 A1 | 11/2007 | Gunderson et al. | |
| 2007/0271105 A1 | 11/2007 | Gunderson et al. | |
| 2007/0274705 A1 | 11/2007 | Kashiwa | |
| 2007/0277352 A1 | 12/2007 | Maron et al. | |
| 2007/0285222 A1 | 12/2007 | Zadnikar | |
| 2007/0287425 A1 | 12/2007 | Bates | |
| 2007/0297320 A1 | 12/2007 | Brummette et al. | |
| 2008/0001735 A1 | 1/2008 | Tran | |
| 2008/0002031 A1 | 1/2008 | Cana et al. | |
| 2008/0002599 A1 | 2/2008 | Denny et al. | |
| 2008/0030580 A1 | 2/2008 | Kashhiawa et al. | |
| 2008/0042825 A1 | 2/2008 | Denny et al. | |
| 2008/0043736 A1 | 2/2008 | Stanley | |
| 2008/0049830 A1 | 2/2008 | Richardson | |
| 2008/0063252 A1 | 3/2008 | Dobbs et al. | |
| 2008/0084473 A1 | 4/2008 | Romanowich | |
| 2008/0100705 A1 | 5/2008 | Kister et al. | |
| 2008/0122603 A1 | 5/2008 | Piante et al. | |
| 2008/0129518 A1 | 6/2008 | Carlton-Foss | |
| 2008/0143481 A1 | 6/2008 | Abraham et al. | |
| 2008/0144705 A1 | 6/2008 | Rackin et al. | |
| 2008/0169929 A1 | 7/2008 | Albertson et al. | |
| 2008/0170130 A1 | 7/2008 | Ollila et al. | |
| 2008/0211906 A1 | 9/2008 | Lovric | |
| 2008/0222849 A1 | 9/2008 | Lavoie | |
| 2008/0239064 A1 | 10/2008 | Iwasaki | |
| 2008/0246656 A1 | 10/2008 | Ghazarian | |
| 2008/0266118 A1 | 10/2008 | Pierson et al. | |
| 2008/0307435 A1 | 12/2008 | Rehman | |
| 2008/0316314 A1 | 12/2008 | Bedell et al. | |
| 2009/0002491 A1 | 1/2009 | Haler | |
| 2009/0002556 A1 | 1/2009 | Manapragada et al. | |
| 2009/0027499 A1 | 1/2009 | Nicholl | |
| 2009/0052685 A1 | 2/2009 | Cilia et al. | |
| 2009/0070820 A1 | 3/2009 | Li | |
| 2009/0122142 A1 | 5/2009 | Shapley | |
| 2009/0135007 A1 | 5/2009 | Donovan et al. | |

(56) References Cited

U.S. PATENT DOCUMENTS

| | | |
|---|---|---|
| 2009/0169068 A1 | 7/2009 | Okamoto |
| 2009/0189981 A1 | 7/2009 | Siann et al. |
| 2009/0195686 A1 | 8/2009 | Shintani |
| 2009/0207252 A1 | 8/2009 | Raghunath |
| 2009/0213204 A1 | 8/2009 | Wong |
| 2009/0243794 A1 | 10/2009 | Morrow |
| 2009/0251545 A1 | 10/2009 | Shekarri et al. |
| 2009/0252486 A1 | 10/2009 | Ross, Jr. et al. |
| 2009/0276708 A1 | 11/2009 | Smith et al. |
| 2009/0294538 A1 | 12/2009 | Wihlborg et al. |
| 2009/0324203 A1 | 12/2009 | Wiklof |
| 2010/0045798 A1 | 2/2010 | Sugimoto et al. |
| 2010/0050734 A1 | 3/2010 | Chou |
| 2010/0060747 A1 | 3/2010 | Woodman |
| 2010/0097221 A1 | 4/2010 | Kriener et al. |
| 2010/0106707 A1 | 4/2010 | Brown et al. |
| 2010/0118147 A1 | 5/2010 | Dorneich et al. |
| 2010/0122435 A1 | 5/2010 | Markham |
| 2010/0123779 A1 | 5/2010 | Snyder et al. |
| 2010/0177193 A1 | 7/2010 | Flores |
| 2010/0177891 A1 | 7/2010 | Keidar et al. |
| 2010/0188201 A1 | 7/2010 | Cook et al. |
| 2010/0191411 A1 | 7/2010 | Cook et al. |
| 2010/0194885 A1 | 8/2010 | Plaster |
| 2010/0217836 A1 | 8/2010 | Rofougaran |
| 2010/0238009 A1 | 9/2010 | Cook et al. |
| 2010/0238262 A1 | 9/2010 | Kurtz et al. |
| 2010/0242076 A1 | 9/2010 | Potesta et al. |
| 2010/0265331 A1 | 10/2010 | Tanaka |
| 2010/0274816 A1 | 10/2010 | Guzik |
| 2010/0287473 A1 | 11/2010 | Recesso et al. |
| 2011/0006151 A1 | 1/2011 | Beard |
| 2011/0018998 A1 | 1/2011 | Guzik |
| 2011/0050904 A1 | 3/2011 | Anderson |
| 2011/0069151 A1 | 3/2011 | Orimoto |
| 2011/0084820 A1 | 4/2011 | Walter et al. |
| 2011/0094003 A1 | 4/2011 | Spiewak et al. |
| 2011/0098924 A1 | 4/2011 | Baladeta et al. |
| 2011/0129151 A1 | 6/2011 | Saito et al. |
| 2011/1015775 | 6/2011 | Smith et al. |
| 2011/0261176 A1 | 10/2011 | Monaghan, Sr. et al. |
| 2011/0281547 A1 | 11/2011 | Cordero |
| 2011/0301971 A1 | 12/2011 | Roesch et al. |
| 2011/0314401 A1 | 12/2011 | Salisbury et al. |
| 2012/0038689 A1 | 2/2012 | Ishii |
| 2012/0056722 A1 | 3/2012 | Kawaguchi |
| 2012/0063736 A1 | 3/2012 | Simmons et al. |
| 2012/0120258 A1 | 5/2012 | Boutell et al. |
| 2012/0162436 A1 | 6/2012 | Cordell et al. |
| 2012/0188345 A1 | 7/2012 | Salow |
| 2012/0189286 A1 | 7/2012 | Takayama et al. |
| 2012/0230540 A1 | 9/2012 | Calman et al. |
| 2012/0257320 A1 | 10/2012 | Brundula et al. |
| 2012/0268259 A1 | 10/2012 | Igel et al. |
| 2012/0276954 A1 | 11/2012 | Kowalsky |
| 2013/0021153 A1 | 1/2013 | Keays |
| 2013/0033610 A1 | 2/2013 | Osborn |
| 2013/0035602 A1 | 2/2013 | Gemer |
| 2013/0080836 A1 | 3/2013 | Stergiou et al. |
| 2013/0096731 A1 | 4/2013 | Tamari et al. |
| 2013/0148295 A1 | 6/2013 | Minn et al. |
| 2013/0222640 A1 | 8/2013 | Baek et al. |
| 2013/0225309 A1 | 8/2013 | Bentley et al. |
| 2013/0300563 A1 | 11/2013 | Glaze |
| 2013/0343571 A1 | 12/2013 | Lee |
| 2014/0037262 A1 | 2/2014 | Sako |
| 2014/0049636 A1 | 2/2014 | O'Donnell et al. |
| 2014/0092299 A1 | 4/2014 | Phillips et al. |
| 2014/0094992 A1 | 4/2014 | Lambert et al. |
| 2014/0098453 A1 | 4/2014 | Brundula et al. |
| 2014/0140575 A1 | 5/2014 | Wolf |
| 2014/0170602 A1 | 6/2014 | Reed |
| 2014/0192194 A1 | 7/2014 | Bedell et al. |
| 2014/0195105 A1 | 7/2014 | Lambert et al. |
| 2014/0195272 A1 | 7/2014 | Sadiq et al. |
| 2014/0210625 A1 | 7/2014 | Nemat-Nasser |
| 2014/0218544 A1 | 8/2014 | Senot et al. |
| 2014/0227671 A1 | 8/2014 | Olmstead et al. |
| 2014/0311215 A1 | 10/2014 | Keays et al. |
| 2014/0355951 A1 | 12/2014 | Tabak |
| 2015/0050003 A1 | 2/2015 | Ross et al. |
| 2015/0050345 A1 | 2/2015 | Smyth et al. |
| 2015/0051502 A1 | 2/2015 | Ross |
| 2015/0053776 A1 | 3/2015 | Rose et al. |
| 2015/0078727 A1 | 3/2015 | Ross et al. |
| 2015/0088335 A1 | 3/2015 | Lambert et al. |
| 2015/0103246 A1 | 4/2015 | Phillips et al. |
| 2015/0229630 A1 | 8/2015 | Smith |
| 2015/0317368 A1 | 11/2015 | Rhoads et al. |
| 2015/0332424 A1 | 11/2015 | Kane et al. |
| 2015/0358549 A1 | 12/2015 | Cho et al. |
| 2016/0042767 A1 | 2/2016 | Araya et al. |
| 2016/0104508 A1 | 4/2016 | Chee et al. |
| 2016/0127695 A1 | 5/2016 | Zhang et al. |
| 2016/0165192 A1 | 6/2016 | Saatchi et al. |
| 2016/0364621 A1 | 12/2016 | Hill et al. |
| 2017/0070659 A1 | 3/2017 | Kievsky et al. |
| 2017/0195635 A1 | 7/2017 | Yokomitsu et al. |
| 2017/0230605 A1 | 8/2017 | Han et al. |
| 2017/0237950 A1 | 8/2017 | Araya et al. |
| 2017/0244884 A1 | 8/2017 | Burtey et al. |
| 2017/0277700 A1 | 9/2017 | Davis et al. |
| 2017/0287523 A1 | 10/2017 | Hodulik et al. |
| 2018/0023910 A1 | 1/2018 | Kramer |
| 2018/0050800 A1 | 2/2018 | Boykin et al. |

FOREIGN PATENT DOCUMENTS

| | | |
|---|---|---|
| GB | 2273624 | 6/1994 |
| GB | 2320389 | 5/1998 |
| GB | 2343252 | 5/2000 |
| GB | 2351055 | 12/2000 |
| GB | 2417151 | 2/2006 |
| GB | 2425427 | 10/2006 |
| GB | 2455885 | 7/2009 |
| GB | 2485804 A | 5/2012 |
| IE | 20090923 A1 | 9/2010 |
| JP | 294188 | 9/1993 |
| JP | 153298 | 6/1996 |
| JP | 198858 | 7/1997 |
| JP | 10076880 A | 3/1998 |
| JP | 210395 | 7/1998 |
| JP | 2000137263 A | 5/2000 |
| JP | 2005119631 A | 5/2005 |
| KR | 20-0236817 | 8/2001 |
| KR | 1050897 | 7/2011 |
| RU | 2383915 C2 | 3/2010 |
| RU | 107851 U1 | 8/2011 |
| RU | 124780 U1 | 2/2013 |
| WO | 9005076 | 5/1990 |
| WO | 9738526 | 10/1997 |
| WO | 0039556 | 7/1998 |
| WO | 9831146 | 7/1998 |
| WO | 9948308 | 9/1999 |
| WO | 0051360 | 8/2000 |
| WO | 0123214 A1 | 4/2001 |
| WO | 0249881 | 6/2002 |
| WO | 02095757 | 11/2002 |
| WO | 03049446 | 6/2003 |
| WO | 2004036926 A2 | 4/2004 |
| WO | 2009013526 A1 | 1/2009 |
| WO | 2011001180 A1 | 1/2011 |
| WO | 2012037139 A2 | 3/2012 |
| WO | 2012120083 A1 | 9/2012 |
| WO | 2014000161 A1 | 1/2014 |
| WO | 2014052898 A2 | 4/2014 |

OTHER PUBLICATIONS

Edesix VideoBadge, http://www.edesix.com/edesix-products, Sep. 26, 2013, Date Posted: Unknown, pp. 1-3.

(56) References Cited

OTHER PUBLICATIONS

GoPro Official Website: The World's Most Versatile Camera, http://gopro.com/products/?gclid=CKqHv9jT4rkCFWZk7AodyiAAaQ, Sep. 23, 2013, Date Posted: Unknown, pp. 4-9.
Saw Advance Hull Hd EXtreme, www.isawcam.co.kr, Sep. 26, 2013, Date Posted: Unknown, p. 1.
Kustom Signals VieVu, http://www.kustomsignals.com/index.php/mvideo/vievu, Sep. 26, 2013, Date Posted: Unknown, pp. 1-4.
Lea-Aid Scorpion Micro Recorder Patrol kit, http://www.leacorp.com/products/SCORPION-Micro-Recorder-Patrol-kit.html, Sep. 26, 2013, Date Posted: Unknown, pp. 1-2.
Looxcie Wearable & mountable streaming video cams, http://www.looxcie.com/overview?gclid=CPbDyv6piq8CFWeFQAodlhC-w, Sep. 26, 2013, Date Posted: Unknown, pp. 1-4
Midland XTC HD Video Camera, http://midlandradio.com/Company/xtc100-signup, Sep. 26, 2013, Date Posted: Unknown, pp. 1-3.
Panasonic Handheld AVCCAM HD Recorder/Player, http://www.panasonic.com/business/provideo/ag-hmr10.asp, Sep. 26, 2013, Date Posted: Unknown, pp. 1-2.
Notification of Transmittal of the International Search Report and the Written Opinion of the International Search Authority, or the Declaration dated Jan. 30, 2014, International Application No. PCT/US2013/062415; International Filing date Sep. 27, 2013, Applicant: Digital Ally, Inc.
Point of View Cameras Military & Police, http://pointofviewcameras.com/military-police, Sep. 26, 2013, Date Posted: Unknown, pp. 1-2.
POV.HD System Digital Video Camera, http://www.vio-pov.com/index.php, Sep. 26, 2013, Date Posted: Unknown, pp. 1-3.
Invalidity Chart for International Publication No. WO2014/000161 Oct. 31, 2017.
PCT Patent Application PCT/US17/16383 International Search Report and Written Opinion dated May 4, 2017.
SIV Security in Vehicle Driving Partner, http://www.siv.co.kr/, Sep. 26, 2013, Date Posted: Unknown, p. 1.
Spy Chest Mini Spy Camera/Self Contained Mini camcorder/Audio & Video Recorder, http://www.spytechs.com/spy_cameras/mini-spy-camera.htm, Sep. 26, 2013, Date Posted: Unknown, pp. 1-3.
Stalker Vue Law Enforcement Grade Body Worn Video Camera/Recorder, http://www.stalkerradar.com/law_vue.shtml, Sep. 26, 2013, Date Posted: Unknown, pp. 1-2.
SUV Cam, http://www.elmo.co.jp/suv-cam/en/product/index.html, Sep. 26, 2013, Date Posted: Unknown, p. 1.
Taser Axon Body on Officer Video/Police Body Camera, http://www.taser.com/products/on-officer-video/axon-body-on-officer-video, Sep. 23, 2013, Date Posted: Unknown, pp. 1-8.
Taser Axon Flex On-Officer Video/Police Video Camera, http://www.taser.com/products/on-officer-video/taser-axon, Sep. 26, 2013, Date Posted: Unknown, pp. 1-8.
Taser Cam Law Enforcement Audio/Video Recorder (gun mounted), http://www.taser.com/products/on-officer-video/taser-cam, Sep. 26, 2013, Date Posted: Unknown, pp. 1-3.
Tide Leader police body worn camera, http://tideleader.en.gongchang.com/product/14899076, Sep. 26, 2013, Date Posted: Unknown, pp. 1-3.
UCorder Pockito Wearable Mini Pocket Camcorder, http://www.ucorder.com/, Sep. 26, 2013, Date Posted: Unknown, p. 1.
Veho MUVI HD, http://veho-uk.fastnet.co.uk/main/shop.aspx?category=CAMMUVIHD, Sep. 26, 2013, Date Posted: Unknown, pp. 1-5.
Veho MUVI portable wireless speaker with dock, http://veho-uk.fastnet.co.uk/main/shop.aspx?category=camcorder, Sep. 26, 2013, Date Posted: Unknown, p. 1.
Vidmic Officer Worn Video & Radio Accessories, http://www.vidmic.com/, Sep. 26, 2013, Date Posted: Unknown, p. 1.
Vievu Products, http://www.vievu.com/vievu-products/vievu-squared/, Sep. 25, 2013, Date Posted: Unknown, pp. 1-2.
WatchGuard CopVu Wearable Video Camera System, http://watchguardvideo.com/copvu/overview, Sep. 26, 2013, Date Posted: Unknown, pp. 1-2.
Witness Cam headset, http://www.secgru.com/DVR-Witness-Cam-Headset-Video-Recorder-SG-DVR-1-COP.html, Sep. 26, 2013, Date Posted: Unknown, pp. 1-2.
WolfCom 3rd Eye, X1 A/V Recorder for Police and Military, http://wolfcomusa.com/Products/Products.html, Sep. 26, 2013, Date Posted: Unknown, pp. 1-3.
Notification of Transmittal of the International Search Report and the Written Opinion of the International Search Authority, or the Declaration dated Jan. 14, 2016, International Application No. PCT/US2015/056039; International Filing date Oct. 16, 2015, Applicant: Digital Ally, Inc.
U.S. Appl. No. 13/959,142 Final Office Action dated Jul. 20, 2016.
U.S. Appl. No. 13/959,142 Office Action dated Nov. 3, 2015.
*Digital Ally, Inc.* vs. *Taser International, Inc.*, Case No. 2:16-cv-020232 (CJM/TJ); US D. Kan, Complaint for Patent Infringement, Jan. 14, 2016.
*Digital Ally, Inc.* vs. *Enforcement video LLC d/b/a Watchguard Video.*, Case No. 2:16-cv-02349 (CJM/TJ); US D. Kan, Complaint for Patent Infringement, May 27, 2016.
International Association of Chiefs of Police Digital Video System Minimum Specifications; Nov. 21, 2008.
Petition for Inter Partes Review No. 2017-00375, *Taser International, Inc.* v. *Digital Ally, Inc.*, filed Dec. 1, 2016.
Petition for Inter Partes Review No. 2017-00376, *Taser International, Inc.* v. *Digital Ally, Inc.*, filed Dec. 1, 2016.
Petition for Inter Partes Review No. 2017-00515, *Taser International, Inc.* v. *Digital Ally Inc.*, filed Jan. 11, 2017.
Petition for Inter Partes Review No. 2017-00775, *Taser International, Inc.* v. *Digital Ally Inc.*, filed Jan. 25, 2017.
PCT Patent Application PCT/US16/34345 International Search Report and Written Opinion dated Dec. 29, 2016.
State of Utah Invitation to Bid State Cooperative Contract; Vendor: Kustom Signals Inc., Contract No. MA1991, Apr. 25, 2008.
Dyna Spy Inc. hidden cameras, https://www.dynaspy.com/hidden-cameras/spy-cameras/body-worn-wearable-spy-cameras, Sep. 26, 2013, Date Posted: Unknown, pp. 1-3.
U.S. Appl. No. 15/011,132 Office Action dated Apr. 18, 2016, 19 pages.
Zepcam Wearable Video Technology, http://www.zepcam.com/product.aspx, Sep. 26, 2013, Date Posted: Unknown, pp. 1-2.
Automation Systems Article, Know-How Bank Co. Ltd. Takes Leap Forward as a Company Specializing in R&D and Technology Consulting, published Jan. 2005.
Car Rear View Camera—Multimedia Rear View Mirror—4' LCD color monitor, Retrieved from the Internet: <URL: http://web.archive.org/web/20050209014751/http://laipac.com/multimedia-rear-mirror.htm>, Feb. 9, 2005.
ATC Chameleon. Techdad Review [Online] Jun. 19, 2013 [Retrieved on Dec. 30, 2015]. Retrieved from Internet. <URL:http://www.techdadreview.com/2013/06/19atc-chameleon/>.
"Breathalyzer." Wikipedia. Printed Date: Oct. 16, 2014; Date Page Last Modified: Sep. 14, 2014; <http://en.wikipedia.org/wiki/Breathalyzer>.
Dees, Tim; Taser Axon Flex: The next generation of body camera; <http://www.policeone.com/police-products/body-cameras/articles/527231-0-TASER-Axon-Flex-The-next-generation-of-body-camera/>, Date Posted: Mar. 12, 2012; Date Printed: Oct. 27, 2015.
Brown, TP-Link TL-WDR3500 Wireless N600 Router Review, Mar. 6, 2013.
Controller Area Network (CAN) Overview, National Instruments White Paper, Aug. 1, 2014.
Daskam, Samuel W., Law Enforcement Armed Robbery Alarm System Utilizing Recorded Voice Addresses Via Police Radio Channels, Source: Univ. of Ky, Off of Res and Eng., Sery (UKY BU107), pp. 18-22, 1975.
*Digital Ally* vs. *Taser International, Inc.*, Case No. 2:16-cv-232 (CJM/TJ); US D. Kan, Defendant Taser International Inc.'s Preliminary Invalidity Contentions, Jul. 5, 2016.
Electronic Times Article, published Feb. 24, 2005.
Supplementary European Search Report dated Sep. 28, 2010 in European Patent Application No. 06803645.8; Applicant: Digital Ally, Inc.

(56) References Cited

OTHER PUBLICATIONS

W. Fincham, Data Recorders for Accident Investigation, Monitoring of Driver and Vehicle Performance (Digest No. 1997/122), Publication Date: Apr. 10, 1997, pp. 6/1-6/3.

Frankel, Harry; Riter, Stephen, Bernat, Andrew, Automated Imaging System for Border Control, Source: University of Kentucky, Office of Engineering Services, (Bulletin) UKY BU, pp. 169-173, Aug. 1986.

Freudenrich, Craig, Ph.D.; "How Breathalyzers Work—Why Test?." HowStuffWorks. Printed Date: Oct. 16, 2014; Posted Date: Unknown; <http://electronics.howstuffworks.com/gadgets/automotive/breathalyzer1.htm>.

Hankyung Auto News Article, Know-How Bank's Black Box for Cars "Multi-Black Box," Copyright 2005.

Guide to Bluetooth Security: Recommendations of the National Institute of Standards and Technology, National Institute of Standards and Technology, U.S. Dep't of Commerce, NIST Special Publication 800-121, Revision 1 (Jun. 2012).

ICOP Extreme Wireless Mic, Operation Supplement, Copyright 2008.

ICOP Model 20/20-W Specifications; Enhanced Digital In-Car Video and Audio recording Systems, date: Unknown.

ICOP Mobile DVRS; ICOP Model 20/20-W & ICOP 20/20 Vision, date: Unknown.

Bertomen, Lindsey J., PoliceOne.com News; "Product Review: ICOP Model 20/20-W," May 19, 2009.

ICOP Raytheon JPS communications, Raytheon Model 20/20-W, Raytheon 20/20 Vision Digital In-Car Video Systems, date: Unknown.

Overview of the IEEE 802.15.4 standards for Low rate Wireless Personal Area Networks, 2010 7th International Symposium on Wireless Communication Systems (ISWCS), Copyright 2010.

Lewis, S.R., Future System Specifications for Traffic Enforcement Equipment, S.R. 1 Source: IEE Colloquium (Digest), N 252, Publication Date: Nov. 18, 1996, pp. 8/1-8/2.

Kopin Corporation; Home Page; Printed Date: Oct. 16, 2014; Posted Date: Unknown; <http://www.kopin.com>.

Translation of Korean Patent No. 10-1050897, published Jul. 20, 2011.

Lilliput RV 18-50NP 5" Rear View Mirror TFT LCD Screen with Camera, Retrieved from the Internet: <URL: http://www.case-mod.com/lilliput-rv1850np-rear-view-mirror-tft-lcd-screen-with-camera-p-1271.html>, Mar. 4, 2005.

Motor Magazine Article, Recreating the Scene of an Accident, published 2005.

New Rearview-Mirror-Based Camera Display Takes the Guesswork Out of Backing Up Retrieved from the Internet: <URL: httb://news.thomasnet.com/fullstory/497750>, Press Release, Oct. 30, 2006.

SIIF Award for Multi Black Box, published Dec. 10, 2004.

Near Field Communication; Sony Corporation; pp. 1-7, Date: Unknown.

Oregon Scientific ATC Chameleon Dual Lens HD Action Camera, http://www.oregonscientificstore.com/Oregon-Scientific-ATC-Chameleon-Dual-Lens-HD-Action-Camera.data, Date Posted: Unknown; Date Printed: Oct. 13, 2014, pp. 1-4.

Asian Wolf High Quality Angel Eye Body Video Spy Camera Recorder System, http://www.asianwolf.com/covert-bodycam-hq-angeleye.html, Sep. 26, 2013, Date Posted: Unknown, pp. 1-3.

Brick House Security Body Worn Cameras/Hidden Cameras/Covert Spy Cameras, http://www.brickhousesecurity.com/body-worn-covert-spy-cameras.html?sf=0#sortblock&CMPID=PD_Google_%22body+camera%22&utm_source=google&utm_medium=cpc&utm_term=%22body+camera%22&mm_campaign=876a94ea5dd198a8c5dc3d1e67eccb34&keyword=%22body+camera%.

Amazon.com wearable camcorders, http://www.amazon.com/s/ref=nb_sb_ss_i_0_4?url=search-alias%3Dphoto&field-keywords=wearable+camcorder&x=0&y=0&sprefix=wear, Sep. 26, 2013, Date Posted: Unknown, pp. 1-4.

Notification of Transmittal of the International Search Report and the Written Opinion of the International Searching Authority, or the Declaration dated Feb. 4, 2016; International Application No. PCT/US2015/056052; International Filing Date: Oct. 16, 2015; Applicant: Digital Ally, Inc.

http://www.k-h-b.com/board/board.php?board=products01&comand=body&no=1, Current State of Technology Held by the Company, Copyright 2005.

City of Pomona Request for Proposals for Mobile Video Recording System for Police Vehicles, dated prior to Apr. 4, 2013.

http://www.k-h-b.com/sub1_02.html, Copyright 2005.

Renstrom, Joell; "Tiny 3D Projectors Allow You to Transmit Holograms From a Cell Phone." Giant Freakin Robot. Printed Date: Oct. 16, 2014; Posted Date: Jun. 13, 2014; <http://www.giantfreakinrobot.com/sci/coming-3d-projectors-transmit-holograms-cell-phone.html>.

Request for Comment 1323 of the Internet Engineering Task Force, TCP Extensions for High Performance, Date: May 1992.

RevealMedia RS3-SX high definition video recorder, http://www.revealmedia.com/buy-t166/cameras/rs3-sx.aspx, Sep. 26, 2013, Date Posted: Unknown, pp. 1-2.

Scorpion Micro DV Video Audio Recorder, http://www.leacorp.com/scorpion-micro-dv-video-audio-recorder/, Sep. 26, 2013, Date Posted: Unknown, pp. 1-3.

"Stalker Press Room—Using In-Car Video, the Internet, and the Cloud to keep police officers safe is the subject of CopTrax live, free webinar." Stalker. Printed Date: Oct. 16, 2014; Posted Date: Jul. 31, 2014.

State of Utah Invitation to Bid State Cooperative Contract; Vendor: ICOP Digital, Inc., Contract No. MA503, Jul. 1, 2008.

Wasson, Brian; "Digital Eyewear for Law Enforcement." Printed Date: Oct. 16, 2014; Posted Date: Dec. 9, 2013; <http://www.wassom.com/digital-eyewear-for-law-enforcement.html>.

X26 Taser, Date Unknown.

Taser International; Taser X26 Specification Sheet, 2003.

Digital Ally First Vu Mountable Digital Camera Video Recorder, http://www.opticsplanet.com/digital-ally-first-vu-mountable-digital-camera-video-recorder.html?gclid=ClKohcX05rkCFSlo7AodU0IA0g&ef_id=UjCGEAAAAWGEjrQF:20130925155534:s, Sep. 25, 2013, Date Posted: Unknown, pp. 1-4.

Drift X170, http://driftinnovation.com/support/firmware-update/x170/, Sep. 26, 2013, Date Posted: Unknown, p. 1.

Petition for Post Grant Review No. PGR2018-00052, *Axon Enterprise, Inc.* v. *Digital Ally, Inc.*, filed Mar. 19, 2018.

MPEG-4 Coding of Moving Pictures and Audio ISO/IEC JTC1/SC29/WG11 N4668 dated Mar. 2002.

European Patent Application 15850436.6 Search Report dated May 4, 2018.

Invalidity Chart for International Publication No. WO2014/000161 Oct. 31, 2017 (Resubmitted).

Final Written Decision for Inter Partes Review No. 2017-00375, *Axon Enterprise, Inc.* v. *Digital Ally, Inc.*, issued Jun. 1, 2018.

* cited by examiner

Mini Configuration Manager

File

FirstVu

Location
- Language: en-US
- Date Format: mm/dd/yy
- 24 Hour Time: TRUE
- Time Zone: UTC-9
- Daylight Saving: FALSE

Profile
- Eventid Enable: FALSE
- Ethnicity Profile: FALSE
- Gender Profile: FALSE
- Incident Enable: FALSE
- Age Profile: FALSE

Settings
- Audio Mute: FALSE
- Audio Pre-Event Enable: FALSE
- Vibrate Record Covert: 10
- Vibrate Standby: 180
- Pre-Event Enable: FALSE
- Memory Mode: INTERNAL
- Vibrate Record Non-Covert: 60
- Entry Timeout: 180

COMPUTER PROGRAM, METHOD, AND SYSTEM FOR MANAGING MULTIPLE DATA RECORDING DEVICES

RELATED APPLICATIONS

This application is a is a continuation and claims priority benefit, with regard to all common subject matter, of earlier-filed U.S. patent application Ser. No. 15/011,132, filed Jan. 29, 2016, and entitled "COMPUTER PROGRAM, METHOD, AND SYSTEM FOR MANAGING MULTIPLE DATA RECORDING DEVICES," which is a continuation patent application and claims priority benefit, with regard to all common subject matter, of earlier-filed U.S. patent application Ser. No. 13/967,151, filed Aug. 14, 2013, and entitled "COMPUTER PROGRAM, METHOD, AND SYSTEM FOR MANAGING MULTIPLE DATA RECORDING DEVICES," which is now U.S. Pat. No. 9,253,452, issued Feb. 2, 2016 ("the '452 patent"), and which are hereby incorporated by reference into the present application in their entirety. This application is also related to U.S. Pat. No. 8,781,292, which is a continuation application that claims priority to the '452 patent, and which is also hereby incorporated by reference into the present application in its entirety.

BACKGROUND

1. Field

Embodiments of the present invention relate to recording device managing apparatus. More particularly, embodiments of the current invention relate to computer programs, methods, apparatus, and systems for managing multiple recording devices by syncing the recording devices, creating time stamps and metadata corresponding to data recordings taken by the recording devices, and transmitting the time stamps and metadata to the recording devices for corroborating the recordings.

2. Related Art

Recording device management systems are used to coordinate recording devices to capture multiple recordings of an event. For example, a control board can be used to start multiple video cameras to record video data from multiple vantage points. However, the control board simply receives a single input such as a button press and transmits it to multiple recording devices. The management system does little, if anything, to react to inputs from the electronic devices or to make decisions based on statuses of the electronic devices. Also, current management systems do not corroborate the recorded data by correlating data taken from distinct devices.

The law enforcement field is growing more dependent on recording devices such as cameras and audio recorders to preserve evidence. Officers now use dash-cams, hidden cameras, and personal recording devices worn by the officers to obtain crucial video and audio data recordings. However, managing these devices and corroborating the recorded data remains difficult and problematic. For example, recording devices often use different cues to start recording, or require manual operation, which can result in the devices failing to record at a crucial time. Manually managing recording devices can be distracting to the officer, which is particularly undesirable in dangerous situations. Another problem is that in a court of law, evidence is bolstered if corroborated or otherwise forensically verifiable, but multiple recordings may be difficult to corroborate based solely on their content. Additionally, correlating and organizing evidence is time consuming and increases the workload of often understaffed law enforcement departments.

SUMMARY

Embodiments of the present invention solve the above-mentioned problems by providing a computer program, method, apparatus, and system for managing multiple data recording devices.

One embodiment of the invention is an intermediate recording device managing apparatus ("recording device manager") for use in a multiple recording device system. The recording device manager comprises a controller including a receiver for receiving from a first recording device a first communication signal that the first recording device has started recording, and a transmitter for transmitting to a second recording device a second communication signal instructing the second recording device to begin recording. The recording device manager thus insures that multiple recording devices record an event.

Another embodiment of the invention is an intermediate recording device managing apparatus for use in a multiple recording device system, wherein the apparatus comprises an internal clock and a controller. The controller obtains time readings from the internal clock and creates time stamps therefrom. The controller transmits the time stamps to synced recording devices for corroborating recordings.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 3 is a settings configuration interface for configuring options and parameters pertaining to managing the recording devices in accordance with an embodiment of the invention;

FIG. 4 is a wireless and security configuration interface for choosing options and parameters pertaining to wireless setup and security precautions in accordance with an embodiment of the invention;

Figure 1:
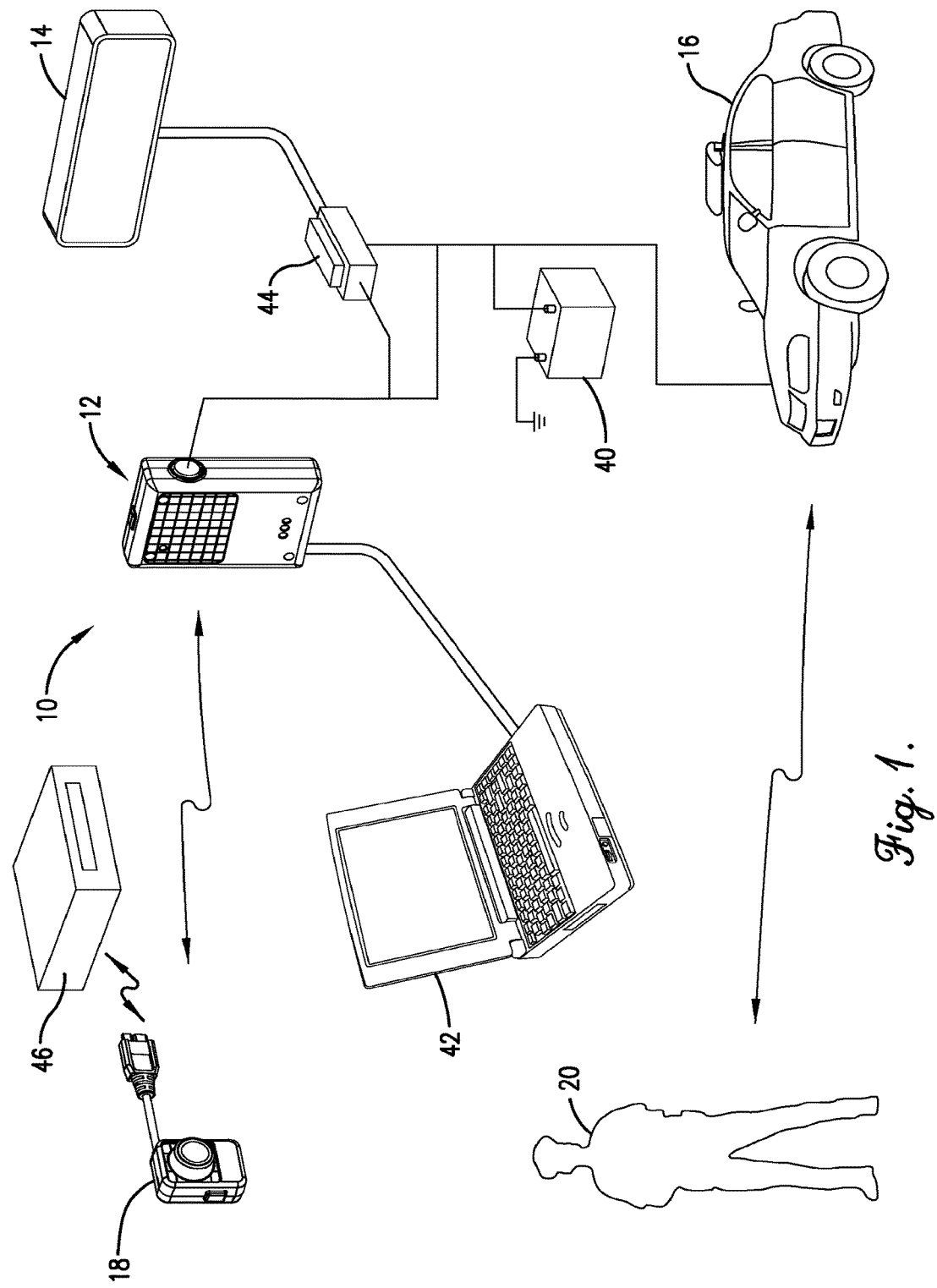
FIG. 1 is a schematic plan view of a multiple recording device management system including an intermediate recording device managing apparatus, a vehicle video recording device mounted in a police vehicle, and a personal video recording device carried by an officer, in accordance with an embodiment of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the figures, and particularly FIG. 1, a first embodiment of a multiple recording device management system 10 (hereinafter "management system 10") is described, which includes an intermediate multiple recording device managing apparatus 12 (hereinafter "recording device manager" or "manager"), a vehicle recording device 14 mounted in a police vehicle 16 and communicatively coupled (i.e., synced) to the recording device manager 12, and a personal recording device 18 carried by a police officer 20 and wirelessly synced to the recording device manager 12. The recording device manager 12 is operable to detect when the vehicle recording device 14, personal recording device 18, or any other synced device in range has started recording and to broadcast or transmit a signal to any synced recording device in range instructing recording by the respective device. The recording device manager 12 also may generate time stamps and unique serial numbers for a data recording, and create or collect metadata and transmit such time stamps, unique serial number, and metadata to the recording devices 14, 18 for corroborating the recorded data. For illustrative purposes, the management system 10 includes the vehicle recording device 14 and the personal recording device 18, but it will be understood that duplicate or additional devices, such as audio recorders, thermal imagers, security cameras, radios, seismic sensors, radar and LIDAR scanners, and chemical analyzers, can be synced to the recording device manager 12. Moreover, multiple personal recording devices 18 can be synced with the manager 12, as described below.

In embodiments of the present invention, the vehicle recording device 14 and personal recording device 18 are each operable to record data, including without limitation, audio and video data. Moreover, the recording devices 14, 18 are also operable to record or generate metadata associated with the recording, such that the data recorded by the devices 14, 18 includes the audio data, the video data, and/or the metadata associated with either or both of the audio and video data. Examples of metadata for an audio or video recording include a location (as determined by a GPS) where the data was recorded, a user who recorded the data or was otherwise associated with the recording device 14, 18 (e.g., an officer driving a police vehicle or an officer wearing the personal recording device 18), the time stamp and unique serial number described in detail below, a number of data-capture devices synced upon initiation od the data recording event, a trigger for the data recording event (i.e., what prompted data capture by the recording devices), etc. Thus, reference herein to "recorded data" is intended to include audio data, video data, and any metadata associated with the audio and video data. Additionally, in embodiments where the recording device manager is synced with ancillary data-capture devices, such as a thermal imager or radar or LIDAR scanner, for example, such data (including any metadata) generated or otherwise captured by the ancillary devices also encompasses "recorded data." For ease of reference, video or audio recorded data may be discussed herein for particular examples but should not otherwise be considered limiting of the types of recorded data.

An exemplary scenario of the management system 10 in use is now described for illustrative purposes. The management system 10 may be used by the police officer 20 to record video data during a traffic stop. The recording device manager 12 may be mounted near the vehicle recording device 14, such as on the windshield of the police vehicle 16. Alternatively, the recording device manager 12 may be mounted anywhere within the police vehicle 16 that allows for the recording device manager 12 to communicate (either via a wired or wireless connection) with the vehicle recording device 14 or a recording device manager (not shown). In exemplary embodiments, the vehicle recording device 14 is aimed forwards to record the traffic stop, and the personal recording device 18 is mounted to the police officer's person or is otherwise carried by the police officer 20, such as on a lanyard.

As described in more detail below, the recording device manager 12 is communicatively coupled with at least one personal recording device 18 and is operable to instruct recording of data by the personal recording device 18. In other embodiments of the present invention, the recording device manager 12 may be communicatively coupled with a plurality of personal recording devices 18 carried by a plurality of officers. The recording device manager 12 of embodiments of the present invention manages recording of multiple devices during, for example, a traffic stop by the police officer 20. As often occurs, the police officer 20 wearing the personal recording device 18 will exit the vehicle and approach a situation (such as a stopped car). Should the officer instruct recording by the personal recording device 18, or should the personal recording device 18 automatically begin recording in response to a triggering event, as described in more detail below, the recording device manager 12 receives a signal that the personal recording device 18 has begun recording. The recording device manager 12 then in turn instructs recording by the vehicle recording device 14.

The recording device manager 12 can also perform the converse of the above exemplary scenario. In particular, should the vehicle recording device 14 begin recording, either through manual instruction by the officer or in response to a triggering event, the recording device manager 12 will receive notification of same and instruct the personal recording device 18 to begin recording.

In embodiments where multiple personal recording devices 18 are synced with the recording device manager 12, the recording device manager will instruct recording by the multiple devices 18. As an example, if a first personal recording device 18 begins recording, such as in response to manual instruction by the officer or in response to a triggering event, a signal will be sent to the recording device manager 12. In turn, the recording device manager 12 will instruct recording by a second personal recording device 18 that is synced with the manager 12. It should be appreciated that this scenario of the manager 12 instructing recording is for every device synced with the manager 12.

In alternative embodiments of the present invention, the personal recording device 18 may include a GPS, an RFID, or another type of location or identification feature or sensor (not shown) that informs the recording device manager 12 of the relational location of the personal recording device 18 to the recording device manager 12. Alternatively, the officer may carry on their person a GPS (such as housed within a mobile communications device), RFID, or other type of location or identification sensor. The recording device manager 12 is communicatively coupled with the location or identification sensor, such that the recording device manager can receive information and signals from the sensor. If the recording device manager 12 determines that the personal recording device is within a preset, maximum range of the vehicle 16, as signaled by the location or identification sensor, then the recording device manager 12 may be programmed to not instruct the personal recording device to begin recording upon the vehicle recording device recording. This may be desirable should the officer be sitting in the vehicle, and therefore, video and audio recordings by the personal recording device are unnecessary.

In yet further embodiments of the present invention, the recording device manager 12 may be programmed such that it instructs recording by the personal recording device when the personal recording device is a predetermined minimum distance away from the vehicle recording device 14 or recording device manager. For example, should the officer step away from the vehicle 16 a preset, minimum distance, the recording device manager 12 will note such and instruct recording by the personal recording device and regardless of whether the vehicle recording device has begun recording. Such a feature may be desirable in situations where the officer is chasing a suspect or is otherwise separated a large distance from their vehicle.

It should be appreciated that the signal received by the recording device manager 12 and from one of the recording devices that such recording device has started recording may actually instead be a signal that such recording device is going to imminently begin recording (this is compared to the signal sent by the recording device manager 12 to the other recording device instructing recording by the other recording device and in response to the first recording device beginning recording). In particular, it may be that the signal sent by the recording device manager 12 and to the second recording device instructing the second recording device to begin recording, such signal being in response to the first recording device beginning recording, is actually a signal that the first recording device received an instruction to begin recording, such as manual activation by the officer, as opposed to a signal that the first recording device has actually started recording. Thus, the signal received by the manager 12 may not actually be a signal that the first device has begun recording, but rather a signal that the first device has been instructed to record or will be recording imminently (as within milliseconds).

As an example, the vehicle recording device 14 may receive an instruction by the officer to begin recording data, including without limitation, audio and video data. Receipt of this instruction by the vehicle recording device 14 causes a first signal to be sent to the recording device manager 12 that the vehicle recording device 14 has been instructed to record. In response to receipt of the first signal, the recording device manager 12 then sends a second signal to the personal recording device 18 instructing such device 18 to begin recording. It should be appreciated that the first signal received by the recording device manager 12 may either include information indicating that the vehicle recording device 14 has already begun recording or has been instructed to record. Thus, reference to the first recording device recording encompasses the first recording device having actually begun recording, having been instructed to begin recording, or about to imminently begin recording.

In addition to instructing the vehicle recording device 14 to begin recording in the above exemplary scenario, the recording device manager 12 also generates time stamps and transmits them to the personal recording device 18 and the vehicle recording device 14. A time stamp is any information identifying the particular time of day (and, in some embodiments, the date) an item of data was recorded, such that the item of data is associated with the particular time via the time stamp. As such, the time stamp may be a sequence of characters identifying the time (either or both in human or computer-readable format). The time stamp may be encoded, and in embodiments, the time stamp may be incorporated or otherwise shown on any video image viewable by a user. The time stamp is transmitted to the recording devices 14, 18, each of which includes an internal clock independent of the internal clock of the recording device manager 12. Because the independent internal clocks of the recording devices 14, 18 are not necessarily synchronized and otherwise have different time settings for the clock (i.e., each clock of each device may record a different time for a particular point in time), the time stamp serves as a shared reference point for corroborating data points of the data recorded by the recording devices 14, 18.

In embodiments of the present invention, a unique serial number is generated and provided by the recording device manager 12 and to each of the recording devices 14, 18. For example, for a particular data recording event, such as a traffic stop, the recording device manager 12 generates a unique serial number for the data recording event. The manager 12 then assigns the unique serial number to the data recording event and transfers or otherwise provides the unique serial number to each of the data recording devices, such as the recording devices 14, 18. Thus, in embodiments, a unique serial number is generated each time a data recording is initiated. In embodiments, the unique serial number can be provided in addition to the above-referenced time stamp or in place of the time stamp. Upon receipt of the unique serial number from the recording device manager 12, the recording devices 14, 18 write the unique serial number and any information associated therewith as metadata to a metadata file associated with the data recording. In embodiments of the present invention, the same unique serial number generated by the manager 12 and associated with the data-capture event is sent to each of the recording devices 14, 18. However, in other embodiments, the manager 12 may generate different unique serial numbers for the data-capture event to send to each recording device 14, 18. The manager 12 may then link or otherwise associate the different unique serial numbers sent to each of the recording devices for the particular data-capture event.

The unique serial number serves to validate the time stamp as having been generated by a genuine and properly calibrated recording device manager 12. Additionally, use of the unique serial number and time stamp allow video recording software that manages the data recordings to link together or otherwise associate data recordings having the same serial number and time stamp. Because recorded data is captured by disparate devices, use of the unique serial number assists in associating together the recorded data from each device. An officer or other user reviewing the recorded data will then know when a particular image or item of data obtained from a first recording device occurred and be able to correlate and corroborate such with images or items of data obtained from other recording devices.

In embodiments of the present invention, the time stamp and serial number are sent to the recording devices once, when the recording devices 14, 18 begin recording for the particular data recording event. The recording devices then respectively acknowledge, to the recording device manager 12, receipt of the time stamp and serial number. If the recoding devices do not send their respective acknowledgement to the recording device manager, then the manager may send the time stamp and unique serial number to the recording devices again. In other embodiments of the present invention, such as for especially long data-capture events, the time stamp and unique serial number may be sent more than once, and or a new unique serial number may be generated. In some instances, there may be a brief break or pause in the data recording. In such an instance, the recording device manager may send another, different unique serial number to the recording devices. Alternatively, if a length of time for the break or pause is the same or less than a preset maximum time limit, the data captured after the break or pause may be associated with the same unique serial number as the data captured before the break or pause.

By beginning to record almost simultaneously as the personal recording device 18, the vehicle recording device 14 is operable to capture additional video and audio data recordings of the situation encountered by the officer, including capturing from a different vantage point than the officer. The time stamp and serial number corresponding to the captured and recorded video and audio data recordings from the personal recording device 18 can be matched with the concurrent time stamp corresponding to the captured and recorded video and audio data recordings from the vehicle recording device 14 to link the recordings chronologically. Such is desirable to forensically establish the timing of certain events captured by the two devices 14, 18 and the relation of the recorded images and audio from the personal recording device to the recorded images and audio from the vehicle recording device.

In even further embodiments, the time stamp and serial number sent from the manager 12 and to each recording device may include metadata, such as an identification that the time stamp came from the manager 12, other recording devices to which the manager sent the same time stamp information, a date (if not already included in the time stamp), any triggering event (as described herein), etc.

In yet further embodiments, the time stamp may actually be created by the particular recording device, as opposed to the manager 12. In such a case, the manager sends the time reading to the recording device, and the recording device in turn creates the time stamp.

As can be appreciated, the feature of the recording device manager 12 managing the time stamps can also be used with other ancillary devices. For example, in the case of the manager 12 being synced with a LIDAR, the manager 12 can time stamp when an officer records a particular speed reading and send the time stamp to the LIDAR. The speed reading can then be corroborated with pictures or video created by other recording devices.

In embodiments of the present invention, the signals transmitted and received by the recording device manager 12 may be responsive to a triggering event (also more simply known as a "trigger"). Examples of a triggering event may include, for example, turning on the vehicle's siren and/or signal lights, an accelerometer measurement outside a pre-established norm, a position of the vehicle and/or officer as measured by a GPS, a vehicle crash event or the police vehicle 16 attaining a threshold speed (e.g., 80 m.p.h.), etc. In embodiments, the recording device manager 12 may receive a signal from, for example, the vehicle recording device 16 indicative of a triggering event. In response to receipt of the signal, or based on a type of triggering event as evidenced by the signal, the recording device manager 12 may instruct recording by the personal recording device 18. As an exemplary scenario, the recording device manager may receive a signal identifying a triggering event of the police officer being more than twenty feet from the vehicle. Upon receipt of the signal, the recording device manager 12 sends a signal to the personal recording device 18 to instruct the device 18 to begin recording. It should be appreciated that other types of triggering events and exemplary scenarios can be employed.

Figure 2:
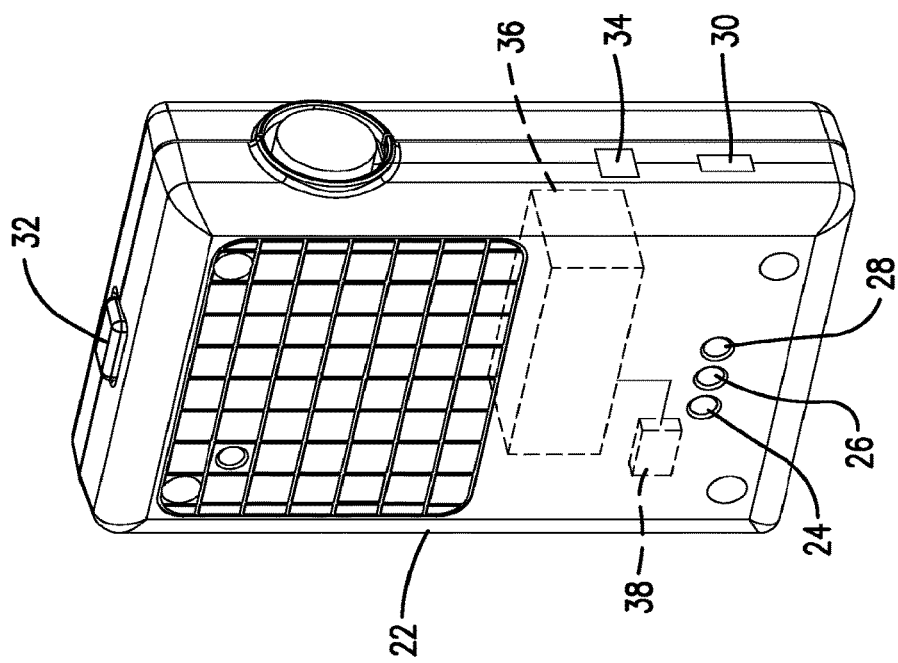
FIG. 2 is a perspective view of the intermediate recording device managing apparatus of FIG. 1 constructed in accordance with an embodiment of the invention.

As shown in FIGS. 1 and 2, the recording device manager 12 is generally portable and is approximately 1 inch thick, 3 inches wide, and 5 inches tall but can take another shape and can be much larger or smaller. The recording device manager 12 is a standalone device but can be incorporated into other devices, such as a police laptop, a police radio, a recording device (including the vehicle recording device 14), or a mobile communications device.

The recording device manager 12 is permanently or removably mounted anywhere in the police vehicle 16 that is easy to reach, such as on the dashboard, center console, or windshield. Permanently mounting the vehicle recording device 14 helps to prevent assailants from stealing or breaking it. The recording device manager 12 can advantageously be oriented so that the police officer 20 can view its indicators (described below) from vantage points inside and outside of the police vehicle 16. Alternatively, the recording device manager 12 can be carried or worn by the police officer 20, such as on his utility belt or in his pocket.

Referring to FIG. 2, the recording device manager 12 includes a housing 22; first, second, and third indicator 24, 26, 28; a receiver 30 for receiving from either the vehicle recording device 14 or the personal recording device 18 information, including a signal, that such recording device has started recording; a transmitter 32 for transmitting a signal; a communication port 34 for communicatively connecting the recording device manager 12 to an external computing device; and a controller 36 for performing algorithms, managing data, and generating signals and receiving information indicative of triggering events. The recording device manager 12 may also include other controllers, circuitry, computer hardware, and software for performing algorithms, handling, managing, and storing data, and generating and interpreting signals. The recording device manager 12 further includes an internal clock 38 for generating time stamps to be transmitted to the recording devices 14, 18, as discussed above. Alternatively, time functions can be handled by a Global Navigation Positioning System. The recording device manager 12 is connected to and receives power from a power source 40 described below.

The housing 22 protects the above electronic components from moisture, tampering, and forceful damage and can be made out of any durable material, such as plastic or metal. The housing 22 has rounded edges for aesthetics and ease of handling, and is formed from typical molding or casting processes. The housing 22 allows for the indicators 24, 26, 28 to be visible to the officer 20 and for the receiver 30 and port 34 to be connectable to the recording device 14 and external computers, respectively. The housing 22 is formed of a front and back operable to connect to each other to form a case and to be separated for maintenance or troubleshooting.

The indicators 24, 26, 28 are three light emitting diodes (LEDs), or alternatively, backlit cells, graphical displays, or analog indicators that communicate to the police officer 20 various statuses of the recording device manager 12 and recording devices 14, 18. The indicators 24, 26, 28 may use different indications for the various statuses depending on the recording devices (described below) synced to the recording device manager 12.

The first indicator 24 is red and illuminates when power is applied to the recording device manager 12 and is off when no power is applied thereto. The second indicator 26 is yellow and illuminates when the police vehicle ignition is on and slowly blinks a single pulse when the police vehicle ignition is off and the recording device manager 12 is in a low power standby. Alternatively, the second indicator 26 may illuminate when the vehicle recording device 14 is on and slowly blinks two pulses when the vehicle recording device 14 is off and the recording device manager 12 is in a low power standby. The second indicator 26 blinks quickly when at least one of the recording devices 14, 18 is recording.

The third indicator 28 is green and illuminates when the recording device manager 12 is not synced to any personal recording device 18. The third indicator 28 blinks a long pulse followed by a number of short pulses indicating the number of personal recording devices 18 that are synced to the recording device manager 12.

The indicators 24, 26, 28 may also cooperatively communicate a status by, for example, displaying a "chasing" pattern indicating that the personal recording device 18 is booting or resetting. This helps to verify that all three indicators 24, 26, 28 are operational. Also, the indicators 24, 26, 28 can be temporarily disabled in a covert mode, wherein the indicators 24, 26, 28 do not illuminate at all, by pressing a button or flipping a switch on the recording device manager 12. The covert mode is desirable when police officers do not want to draw attention to themselves or their police vehicles. The indicators 24, 26, 28 can be easily toggled back to normal operating mode by pressing the button or flipping the switch again. The mode (covert or normal) is retained when the recording device manager 12 turns on or switches from a low power standby.

The controller 36 may comprise the receiver 30, the transmitter 32, the internal clock 38, the communication ports, and other related components in any combination. In embodiments of the present invention, the receiver 30 and the transmitter 32 may also collectively form a transceiver. The controller 36 may also include electronic circuitry, a processing element, a memory element, computer hardware, and computer software for illuminating indicators 24, 26, 28 based on system statuses, as described above, and for performing algorithms for managing the recording devices 14, 18, as described below. The controller 36 is powered by the power source 40, also described below.

The receiver 30 is configured to receive a communication from either of the vehicle recording device 14 or the personal recording device 18 indicating that the respective device has started or stopped recording. The receiver 30 may be wireless and may include antennas, signal or data receiving circuits, and signal or data transmitting circuits. The receiver 30 may operate utilizing communication standards, such as cellular 2G, 3G, 4G, Bluetooth™, Wi-Fi, or combinations thereof. Alternatively, or in addition, the receiver 30 may be wired and may include connectors or couplers to receive metal conductor cables or connectors or optical fiber cables.

In embodiments of the present invention, the transmitter 32 is configured to transmit a signal to the personal recording device 18 or the vehicle recording device 14 instructing recording of the respective device. The transmitter 32 may be wireless and may include antennas, signal or data receiving circuits, and signal or data transmitting circuits. The transmitter 32 may operate utilizing communication standards such as cellular 2G, 3G, 4G, Bluetooth™, Wi-Fi, or combinations thereof. Alternatively, or in addition, the transmitter 32 may be wired and may include connectors or couplers to receive metal conductor cables or connectors or optical fiber cables. The antenna may transmit over a range of at least forty feet but the range can be increased or decreased based on internal settings.

The communications port 34 is configured to communicatively connect the controller 36 to an external computing device 42 (described below), as shown in FIG. 1. The communications port 34 may be wireless and may include antennas, signal or data receiving circuits, and signal or data transmitting circuits. The communications port 34 may operate utilizing communication standards such as cellular 2G, 3G, 4G, Bluetooth™, or combinations thereof. Alternatively, or in addition, the communications port 34 may be wired and may include connectors or couplers to receive metal conductor cables or connectors or optical fiber cables. The communications port 34 is operable to receive downloaded software from the external computing device 42 and transmit setup instructions, diagnostic test signals, user settings, and statuses of the recording device manager 12 and the recording devices 14, 18, to the external computing device 42.

Embodiments of the present invention may also comprise one or more computer programs stored in or on computer-readable medium residing on or accessible by the controller 36. The computer programs may comprise listings of executable instructions for implementing logic functions and can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory medium that can contain, store, or communicate the programs. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc read-only memory (CDROM).

The internal clock 38 includes a clock chip operable to keep time and various memory and logic circuits for converting time to computer and human readable data strings. The internal clock 38 can include circuitry such as oscillators, multivibrators, phase-locked loops, counters, or combinations thereof, and can be incorporated into the controller 36. The internal clock 38 has a temporal resolution of approximately 1 ms to 10 ms. The internal clock 38 generates and sends a time reading to the controller 36 at a predetermined frequency, such as once every second or millisecond. The time reading is used by the controller 36 to create time stamps, which are transmitted to the recording devices 14, 18 for corroborating recorded data. The internal clock 38 can be calibrated or adjusted, and the format and frequency of the time readings can be changed via the external computing device 42. The time stamps can be accompanied by a signature of the time stamps' source and other metadata, as described below.

The power source 40 is electronically connected to the recording device manager 12 through dedicated wiring. The power source 40 supplies power to each of the electronic components of the recording device manager 12 and, in embodiments of the present invention, to the vehicle recording device 14. In embodiments of the present invention, the power source 40 is the police vehicle's battery but can be another power source, such as a battery cartridge of the external computing device 42 or the vehicle recording device 14.

The electronic connection between the receiver 30 and the vehicle recording device 14 optionally includes a control area network (CAN) bus 44, which "directs traffic" for incoming and outgoing signals based on indicated importance or other factors and follows an algorithm for determining the order in which (or whether) signals are transmitted.

The vehicle recording device 14 is operable to record audio, video, thermal, chemical, or other data. In some embodiments, the recording device 14 is a video recording device such as one produced by Digital Ally, Inc., including the DVM100, DVM250, DVM250Plus, DVM250Law, DVM400, DV440Ultra, DVM470, DVM500, DVM500Plus, and DVM750. As described above, in one embodiment the recording device 14 is operable to receive a signal of a triggering event, whereas in another embodiment the recording device 14 utilizes the CAN bus 44 and is operable to receive time stamps and metadata (described below) in addition to the signal of a triggering event. In other embodiments, the recording device 14 is a digital audio recorder, heat scanner, or chemical analyzer. The vehicle recording device 14 can be mounted permanently or removably on or inside the police vehicle 16. Permanently mounting the vehicle recording device 14 helps to prevent assailants from stealing or breaking it. The vehicle recording device 14 can be incorporated into the police vehicle's rear view mirror, dashboard, spotlight, or other locations associated with the police vehicle 16 and receives power from the power source 40 through dedicated wiring. In embodiments of the present invention, the vehicle recording device 14 includes a clock substantially similar to the clock 38 for the recording device manager. In addition to the exemplary vehicle recording devices listed above, a vehicle recording device is further described in commonly-owned U.S. application Ser. No. 12/189,192, filed Aug. 10, 2008, entitled "Vehicle-Mounted Video System with Distributed Processing," now U.S. Pat. No. 8,520,069, issued Aug. 27, 2013, and the entirety of which is incorporated by reference herein.

The personal recording device 18 is small, portable, wearable, easily concealed, and is operable to record audio, video, thermal, chemical, or other data. The personal recording device 18 can be worn by the officer 20, such as on the officer's shirt. The personal recording device 18 is operable to receive a signal instructing the device 18 to begin or stop recording, a signal indicative of a triggering event, and time stamps and metadata corresponding to the recordings. Additionally, the personal recording device 18 further includes a clock, substantially similar to the clock 38 described above for the recording device manager 12, for determining a time corresponding to when a particular item of data was recorded. An exemplary personal recording device is the "FIRSTVU HD" produced by Digital Ally, Inc. and further described in U.S. Provisional Patent Application No. 61/707,348 ("the '348 Application"), filed Sep. 28, 2012, and commonly assigned with the present application. The disclosures of the '348 Application and any later-filed non-provisional applications claiming priority to the '348 Application are hereby incorporated by reference into the present application in their entirety.

Recordings generated by the recording devices 14, 18 and associated time stamps, metadata, and user-inputted information (described below) are temporarily stored in a local memory element (hereinafter "memory"), such as a memory of the particular recording devices 14, 18, and/or a memory of a computing device located in the police vehicle 16. This information can then be uploaded to external servers or transferred to the external computing device 42 (described below). The recordings can then be corroborated using the time stamps and metadata.

Many options and parameters pertaining to the various components and operation of the management system 10 can be setup and/or configured by connecting the recording device manager 12 to the external computing device 42 via communications port 34. The external computing device 42 can be a laptop, tablet, mobile device, smartphone, or other computing device. The external computing device 42 displays a graphical user interface (GUI) by which the police officer 20 or other user may choose options and modify parameters of the management system 10. Each option or parameter typically includes a default setting, which is employed if no change is made before use. Police officers 20 can save preferred settings in a profile so that they do not have to be manually changed at the beginning of every shift, for example. The police officer 20 can select his profile to revert to his settings.

The options and parameters for the management system 10 are stored in a configuration file and can be configured by accessing a configuration interface, as shown in FIG. 3. For example, a language and time zone can be selected. The controller 36 thereby shifts the time received from the internal clock 38 or the GNSS to the selected time zone. Daylight saving time can be enabled or disabled. Additionally, the user can toggle between standard twelve or twenty-four hour time formats. The date format for displaying on event recordings can also be changed. For example, the date can be displayed as mm/dd/yyyy or dd/mm/yy.

Metadata to be generated and transmitted to the recording devices 14, 18 can be configured and changed. For example, the locations of the various recording devices 14, 18, an indication of which recording device or triggering event (such as turning the sirens on) caused a trigger signal to be transmitted, the number and identity of synced recording devices, the name of the police officer 20 on duty, or any other information pertaining to the recorded data can be enabled or customized. Inputting additional information for a given event, such as an event description, ethnicity, age, and gender of a suspect, and time of death, can be enabled. If enabled, this information is saved with the recorded data.

Settings pertaining to how the recording devices 14, 18 behave during an event can be changed as well. A pre-event buffer time can be chosen, which requires a device to continually record data and temporarily store it. If, for example, the pre-event buffer time is selected to be thirty seconds, when the officer 20 presses record at time t on the personal recording device 18, it will keep the thirty seconds of temporarily stored data leading up to time t. This allows for a delayed reaction time by the officer 20 without missing important data. Pre-event audio can be selected to be recorded as well. The personal recording device 18 can be set to vibrate when it begins recording. A shorter vibration can also be set for covert mode. The personal recording device 18 can also be set to vibrate when it enters a low power standby. A record-stop time delay can be setup so that when the recording device manager 12 detects that a synced recording device has stopped recording, the time delay lapses before the recording device manager 12 is allowed to broadcast a signal instructing other synced devices to cease recording. This prevents the recording device manager 12 from immediately instructing stopping other device recording. The recording device manager 12 can be enabled to broadcast a signal or alert when the personal recording device 18 goes out of range. Also, an entry timeout duration can be set to prevent tampering or accidental input.

The recording device manager 12 is also operable to enter a low power mode or power saving mode after a predetermined time period has elapsed, such as a predetermined time period of no recording by either of the personal or vehicle recording devices. Moreover, the recording device manager 12 or the system 10 further comprises an input, such as a switch, button, or software selection, for changing the predetermined time period or to reset the elapse of the time period. In operation in embodiments of the present invention, the recording device manager 12 operates in one of two modes—a power on mode or a low power mode. If the vehicle and/or vehicle recording device 14 is on, then the manager 14 is powered on. In contrast, if the vehicle and/or vehicle recording device 14 is off, the manager 14 is powered off.

Figure 4:
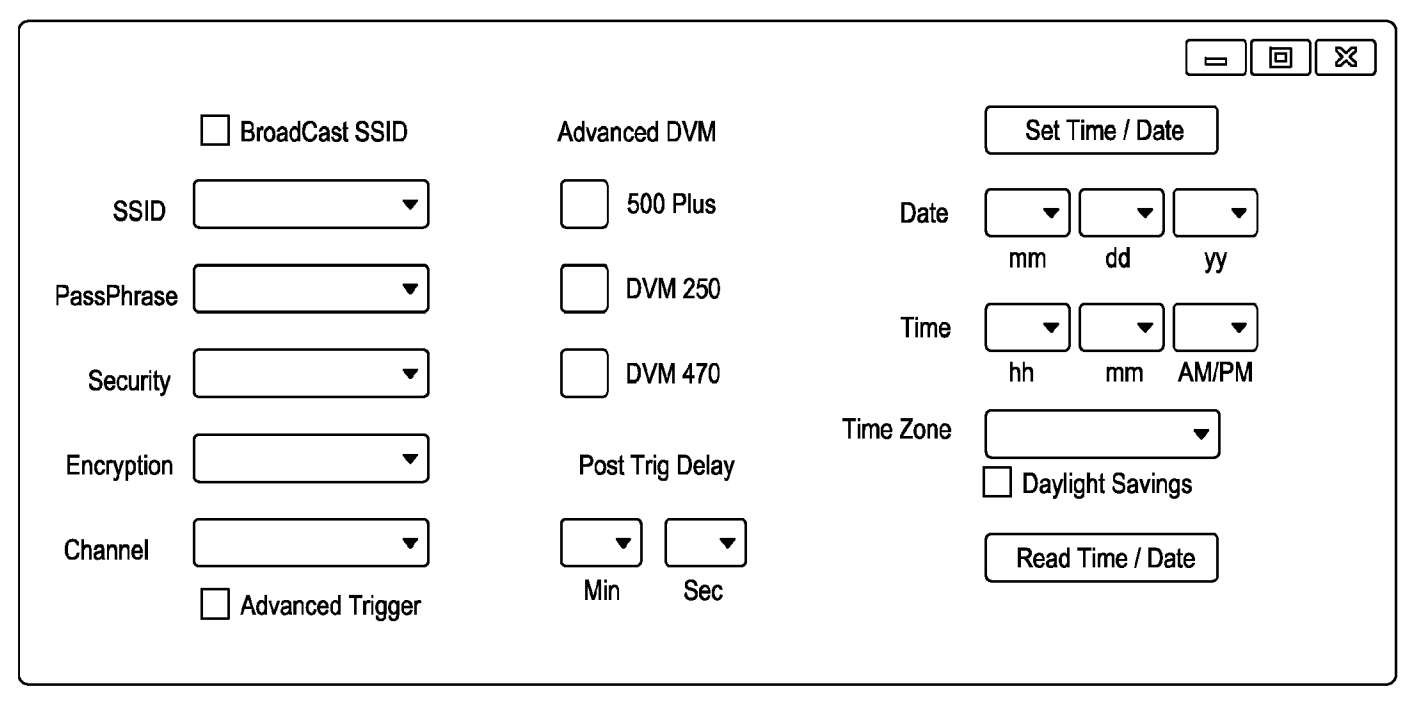

Many security precautions can also be setup, as shown in FIG. 4. For example, one or multiple service set identifiers (SSIDs) for syncing the personal recording device 18 over a wireless communications network, such as Wi-Fi, can be selected. SSID broadcasting can be enabled, which means that other devices (including unrelated devices) in the area can see the SSID. SSID broadcasting can also be disabled, which means that devices in the area must know that the SSID exists in order to use it. Passphrases, passwords, or passcodes corresponding to the SSID can be setup or changed. Data encryption can be turned on, whereby transmissions cannot be easily intercepted and decoded. A wireless communications channel can also be selected. USB ports can be set to secure mode or to operate as a conventional mass storage device. Passphrases for secure USB ports can be chosen as well.

Figure 5:
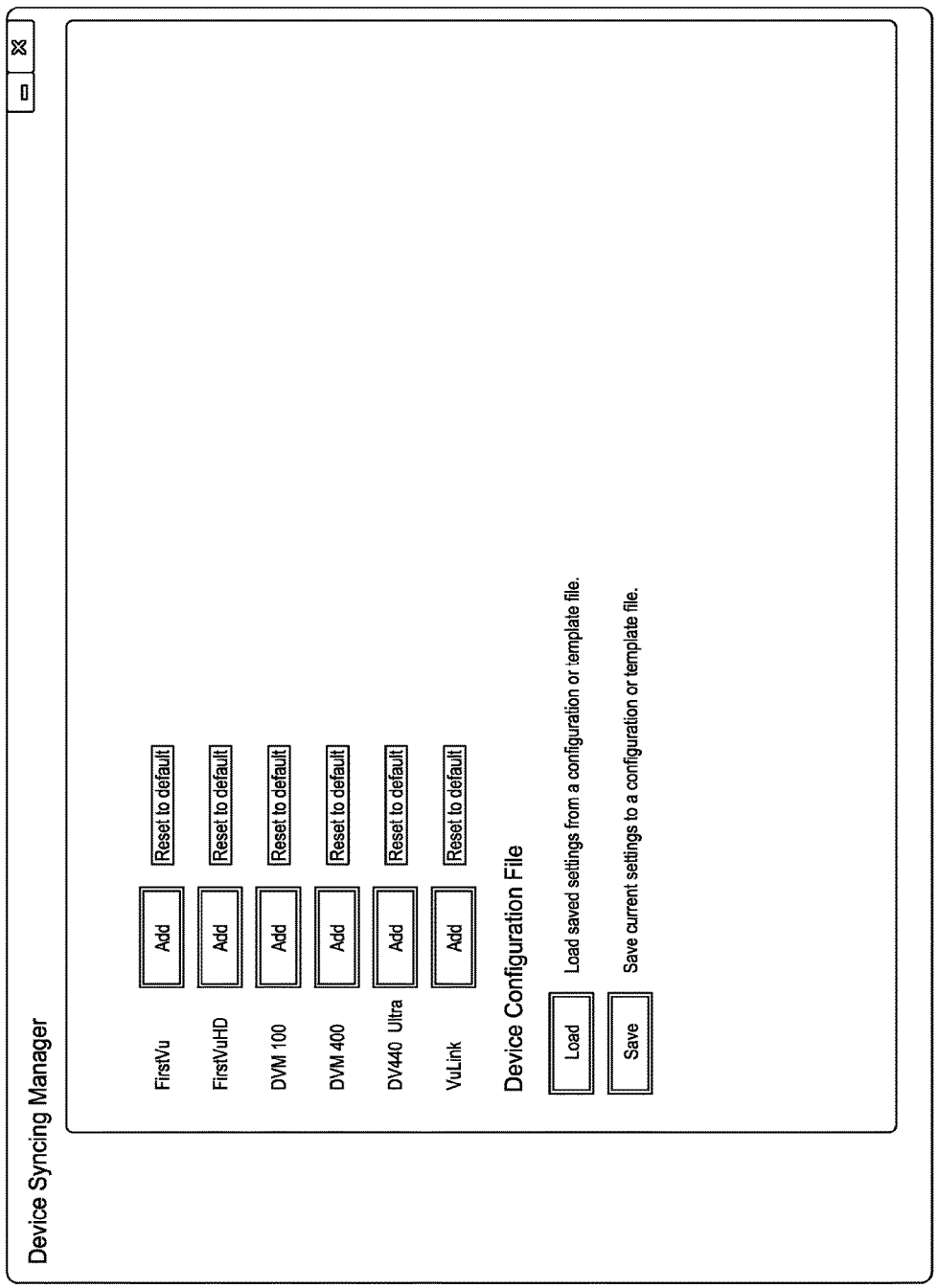
FIG. 5 is a device-syncing interface for syncing recording devices to the intermediate recording device managing apparatus in accordance with an embodiment of the invention.

The recording devices 14, 18 are synced with the recording device manager 12 before use by accessing a device syncing interface, as shown in FIG. 5. The device syncing interface displays a list or table of available recording devices, each of which the user may individually sync ("add") or unsync ("remove"). Previously saved settings corresponding to the recording devices 14, 18 can be loaded, and current settings can be saved for future use.

Each recording device 14, 18 can also sync with only one recording device manager, whereas the recording device manager 12 can sync with multiple recording devices. As an example, if two officer vehicles arrive at a situation, such that an officer from each vehicle is wearing a personal recording device 18, each personal recording device can only be synced with and provide information or signals to a single recording device manager 12, namely its "home" recording device manager that is associated with the respective officer's vehicle. In contrast, should two officer vehicles arrive at a situation, and the vehicle recording device in one of the vehicles begins recording, then the recording device manager, receiving the recording signal from the vehicle recording device, is operable to instruct the personal recording devices of both officers (of the two separate officer vehicles) to begin recording. In an alternative embodiment, the personal recording device 18 may be configured to have a hierarchy of recording device managers with which to communicate. For example, the personal recording device's home recording device manager is at the top of the hierarchy, and will be the first manager with which it will attempt to communicate. If the home recording device is powered down, disabled, or out of range, the personal recording device 18 will attempt to communicate with the next manager in the hierarchy until a successful communication is made.

Figure 6:
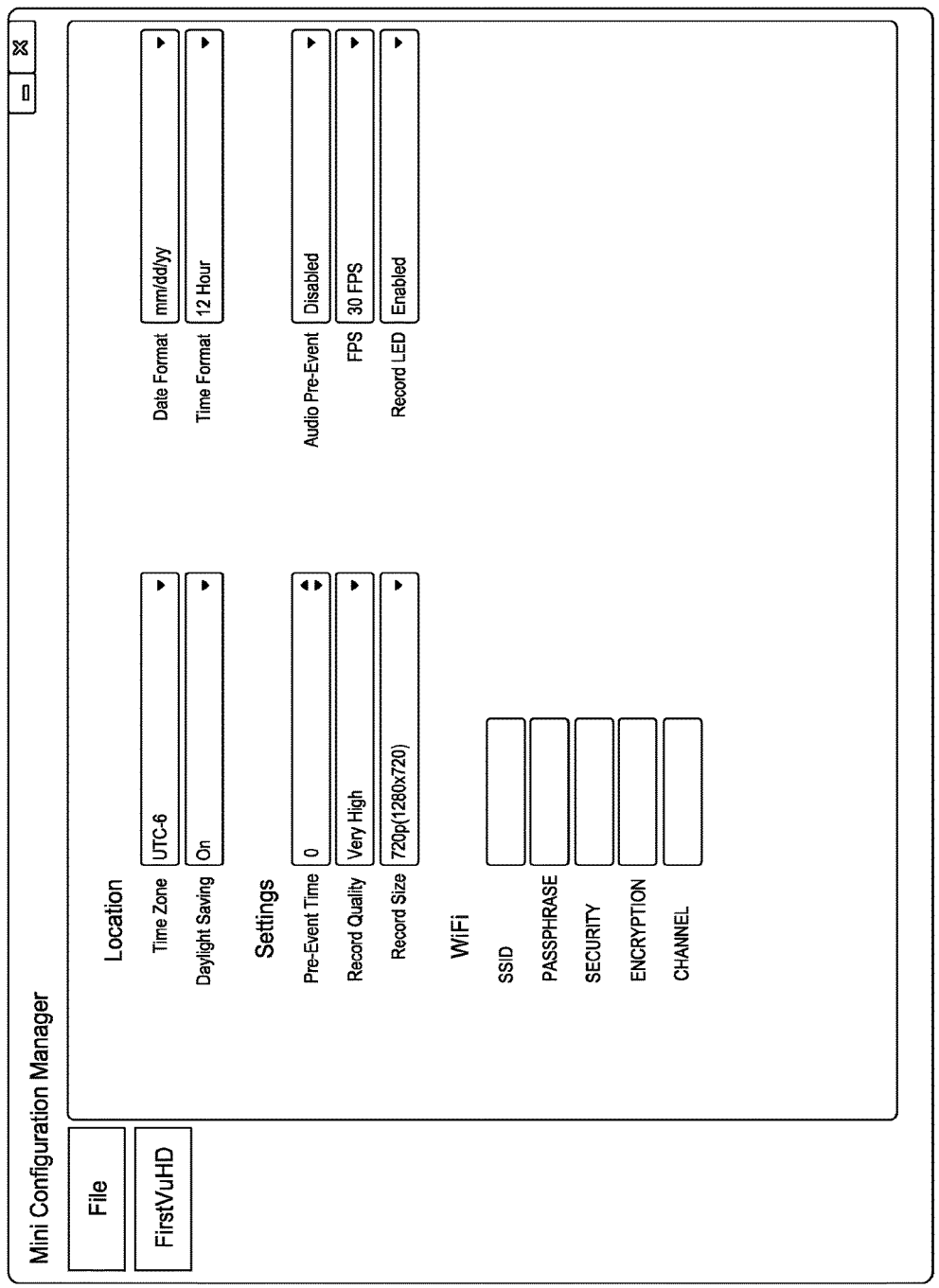
FIG. 6 is a settings configuration interface for configuring options and parameters pertaining to the recording devices in accordance with an embodiment of the invention.

The options and parameters pertaining to the recording devices 14, 18 can be set by accessing a recording settings interface, as shown in FIG. 6. For example, video record quality can be selected from 512 kbps, 1 Mbps, and 2 Mbps, labeled "standard", "high", and "very high", respectively. Record frame rate can be selected from 5 to 60 fps. Record size can be selected from VGA (640×480 pixels), 720p (1280×720 pixels), and 1080p (1920×1080 pixels). Also, an indicator LED can be enabled to illuminate when the personal recording device 18 is recording.

The recording devices 14, 18 can be allowed to upload recordings to an external server or computing device. The external server or computing device could be a computing device housed in the vehicle, a centralized computing device, such as housed at a police precinct, or a DVR 46 (see FIG. 1) or other large-capacity storage device. Multiple Wi-Fi authorized upload times can be set, which denote when recording devices 14, 18 are allowed to upload data. Ideally, upload times will be set during non-use times such as shift changes, lunch breaks, and off duty times. Alternatively, uploading of recorded data can occur whenever the recording devices are within a predetermined distance from the external server or computing device, such as when the officer is located in the vehicle or, preferably, when the officer's vehicle is located near the police precinct. Upload settings can be changed as well.

Turning again to FIG. 1, use of the management system 10 and recording device manager 12 is now explained. As previously discussed, the exemplary management system 10 includes the vehicle recording device 14 and personal recording device 18, but it will be understood that duplicate or additional recording devices, such as audio recorders, thermal imagers, security cameras, radios, seismic sensors, radar and LIDAR scanners, and chemical analyzers, can be synced to the recording device manager 12. The officer 20 first connects the external computing device 42 to the recording device manager 12, sets the various options and parameters described above, and then optionally disconnects the external computing device 42 from the recording device manager 12. Once the recording devices 14, 18 are synced with the recording device manager 12, the management system 10 is ready to be used.

As a situation unfolds, the officer 20 will decide to capture video, audio, or other data as evidence, and will either cause the personal recording device 18 to begin recording if he is on foot, or cause the vehicle recording device 14 to begin recording if he is inside the police vehicle 16. In either case, the device that is recording transmits a signal to the recording device manager 12 indicating that it has begun recording, and then continues to transmit a signal indicating that it is recording. The recording device manager 12 receives the signal and broadcasts or transmits a signal to the other recording device 14, 18 to instruct the other recording device 14, 18 to begin recording. As discussed above, the recording device manager 12 may also instruct recording of the recording device 14, 18 upon receipt of a signal indicative of a triggering event, such as the officer turning on the police vehicle sirens, police lights, spotlight, etc.

If the personal recording device 18 begins recording but is out of range of the recording device manager 12 (e.g., greater than a preset distance, such as forty feet, from the recording device manager 12), the recording device manager 12 will not detect that the personal recording device 18 is recording and thus will not broadcast a signal to the other recording device, namely the vehicle recording device 14, to instruct recording. However, if the personal recording device 18 comes into range while recording, the recording device manager 12 will detect the continuously transmitted signal from the personal recording device 18 and will then broadcast a signal to instruct recording by the vehicle recording device 14.

In even further embodiments of the present invention, the recording device manager 12 detects when a recording device 14, 18 has stopped recording and transmits a signal to the other recording device 14, 18 indicating that it should stop recording. In an alternative embodiment, the recording device manager 12 only transmits a signal to the other recording device 14, 18 that it may stop recording but does not otherwise instruct ceasing of recording. When a recording device 14, 18 receives this permission, the officer 20 can then manually stop the recording on that device. This prevents accidentally, unintentionally, or prematurely ending a recording and losing important data. For the same reasons, the recording device manager 12 may indicate to one of the recording devices 14, 18 that the other recording device is no longer in range or that power to a recording device has been lost and that it should stop recording. Alternatively, the recording device manager 12 instructs the other recording device 14, 18 that it may stop recording. Similarly, if the signal to instruct recording was in response to a triggering event, such as by turning on the sirens, police lights, or spotlight, etc., and the triggering event subsequently ceases, the recording device manager 12 may transmit a signal to the other recording device 14, 18 that it may stop recording.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A data recording and management system comprising:
a first video recorder for recording video data of a law enforcement event, said first video recorder having a first image sensor, a first computer storage medium, and a first communications interface and configured to be mounted in a law enforcement vehicle;
a second video recorder for recording video data of the law enforcement event, said second video recorder having a second image sensor, a second computer storage medium, and a second communications interface and configured to be mounted on or worn by a law enforcement officer;
a video recording manager integrated into the law enforcement vehicle, said video recording manager having a third communications interface and configured to:
receive a trigger signal;
said trigger signal being indicative of the law enforcement officer exiting the law enforcement vehicle;
broadcast, in response to receiving the trigger signal, at least one communication signal to the first video recorder and the second video recorder instructing the first video recorder and the second video recorder to begin recording; and
one or more non-transitory computer readable storage media storing computer-executable instructions that, when executed by a processor, perform the following steps:
receive the recorded video data from the first video recorder and the second video recorder;
present, to the law enforcement officer on a display, one or more fields for inputting data related to the recorded video data;
receive data inputted by the law enforcement officer in at least one of the one or more fields presented on the display; and
associate the received inputted data with the recorded video data; and
upload the recorded video data from the first video recorder and the second video recorder and the data inputted by the law enforcement officer to an external server.

2. The system of claim 1, wherein the processor and the display are mounted in the law enforcement vehicle.

3. The system of claim 1, wherein the processor and the display are integrated into an external law enforcement computing device selected from the group consisting of a smartphone and a tablet.

4. The system of claim 1, wherein data from an ancillary data-capture device is further associated with the recorded video data.

5. The system of claim 1, wherein the ancillary data-capture device is selected from the group consisting of a radar detector and a LIDAR detector.

6. The system of claim 1, wherein the trigger signal is generated based on data received from a location sensor of the law enforcement officer.

7. The system of claim 1, wherein a first unique serial number of the first video recorder and a second unique serial number of the second video recorder are stored with the video recording data.

8. A method of recording and managing video data of a law enforcement event, comprising the steps of:
receiving a trigger signal indicative of a law enforcement officer exiting a law enforcement vehicle;

broadcasting, in response to receiving the trigger signal, at least one communication signal to a first video recorder and a second video recorder instructing the first video recorder and the second video recorder to begin recording, wherein the first video recorder includes a first image sensor, a first computer storage medium, and a first communications interface and is configured to be mounted in the law enforcement vehicle, wherein the second video recorder includes a second image sensor, a second computer storage medium, and a second communications interface and is configured to be mounted on or worn by the law enforcement officer;

receiving recorded video data from the first video recorder and the second video recorder;

presenting, to the law enforcement officer on a display, one or more fields for inputting data related to the recorded video data;

receiving, via an input device, data inputted by the law enforcement officer in at least one of the one or more fields presented on the display; and associating the received inputted data with the recorded video data; and uploading the recorded video data from the first video recorder and the second video recorder and the data inputted by the law enforcement officer to an external server.

9. The method of claim 8, wherein the processor and the display are mounted in the law enforcement vehicle.

10. The method of claim 8, wherein the input device and the display are integrated into an external law enforcement computing device selected from the group consisting of a smartphone and a tablet.

11. The method of claim 8, further comprising the step of associating data from an ancillary data-capture device with the recorded video data.

12. The method of claim 11, wherein the ancillary data-capture device is selected from the group consisting of a radar detector and a LIDAR detector.

13. The method of claim 8, further comprising the steps of:
receiving, from a location sensor of the law enforcement officer, location data of the law enforcement officer;
receiving, from a location sensor of the law enforcement vehicle, location data of the law enforcement vehicle;
comparing the location data of the law enforcement officer to the location data for the law enforcement vehicle;
based on a result of the step of comparing, generating the trigger signal.

14. The method of claim 8, further comprising the steps of:
associating a first unique serial number of the first video recorder with the video recording data; and
associating a second unique serial number of the second video recorder with the video recording data.

15. One or more non-transitory computer-readable media storing computer-executable instructions that, when executed by a processor, perform a method of managing video recordings of a law enforcement event, the method comprising the steps of:

receiving, from a location sensor of a law enforcement officer, location data of the law enforcement officer;
based on the location data of the law enforcement officer, generating a trigger signal,
wherein the trigger signal is indicative of the law enforcement officer exiting a law enforcement vehicle;
broadcasting, in response to the trigger signal, at least one communication signal to a first video recorder and a second video recorder instructing the first video recorder and the second video recorder to begin recording,
wherein the first video recorder includes a first image sensor, a first computer storage medium, and a first communications interface and is configured to be mounted in the law enforcement vehicle,
wherein the second video recorder includes a second image sensor, a second computer storage medium, and a second communications interface and is configured to be mounted on or worn by the law enforcement officer;
receiving first recorded video data from the first video recorder and second recorded video data from the second video recorder;
presenting, to the law enforcement officer on a display, one or more fields for inputting data related to at least one of the first recorded video data and the second recorded data;
receiving, via an input device, data inputted by the law enforcement officer in at least one of the one or more fields presented on the display; and
associating the received inputted data with one of the recorded video data and the second recorded video data; and
uploading the recorded video data from the first video recorder and the second video recorder and the data inputted by the law enforcement officer to an external server.

16. The media of claim 15, wherein the method further comprises the steps of:
associating a first unique serial number of the first video recorder with the first video recording data; and
associating a second unique serial number of the second video recorder with the second video recording data.

17. The media of claim 15, wherein the location sensor of the law enforcement officer is an RFID sensor.

18. The media of claim 15, wherein the method further comprises the step of associating data from an ancillary data capture device with the first video recording data, and wherein the ancillary data-capture device is selected from the group consisting of a radar detector and a LIDAR detector.

19. The media of claim 15, wherein the input device and the display are integrated into an external law enforcement computing device selected from the group consisting of a smartphone and a tablet.

20. The media of claim 15, wherein the data inputted by the law-enforcement officer relates to at least one of the ethnicity, the age, and the gender of a suspect involved in the law enforcement event.

* * * * *